F. SKERL.
TICKET ISSUING ACCOUNTING MACHINE.
APPLICATION FILED JUNE 14, 1915.

1,290,381.

Patented Jan. 7, 1919.
11 SHEETS—SHEET 2.

Inventor
Francesco Skerl.
by
Attorneys

F. SKERL.
TICKET ISSUING ACCOUNTING MACHINE.
APPLICATION FILED JUNE 14, 1915.

1,290,381.

Patented Jan. 7, 1919.
11 SHEETS—SHEET 3.

Inventor
Francesco Skerl.
Attorneys

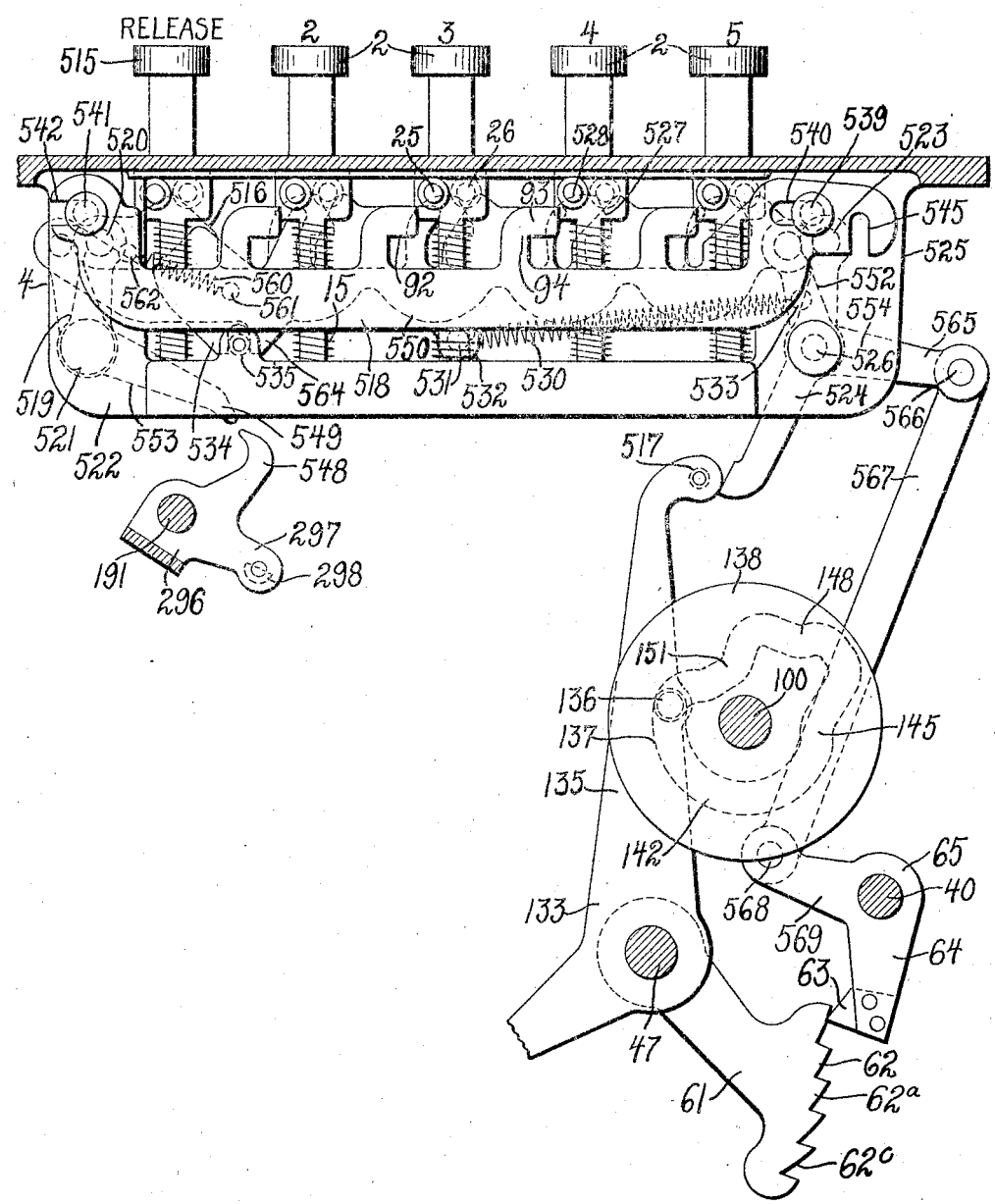

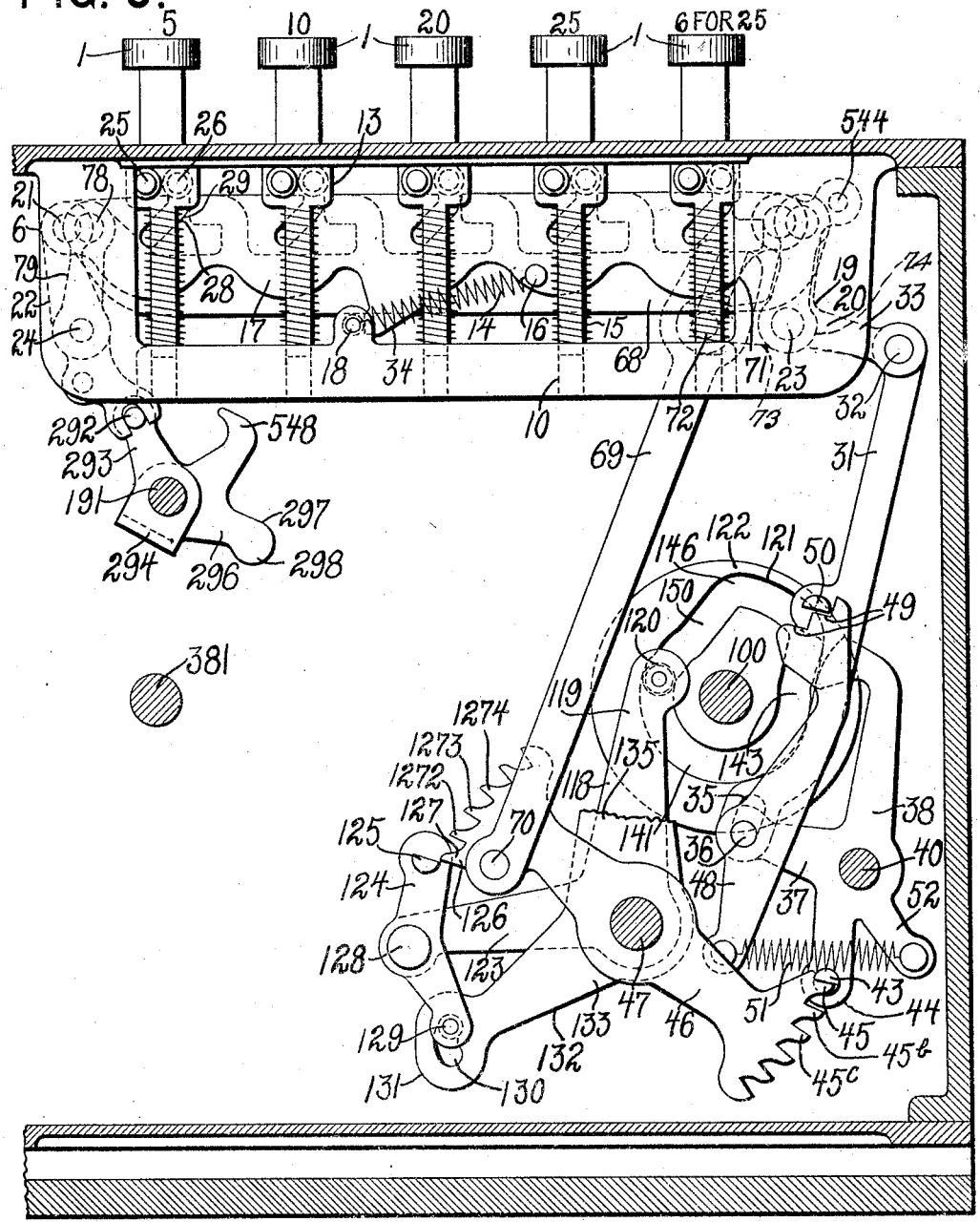

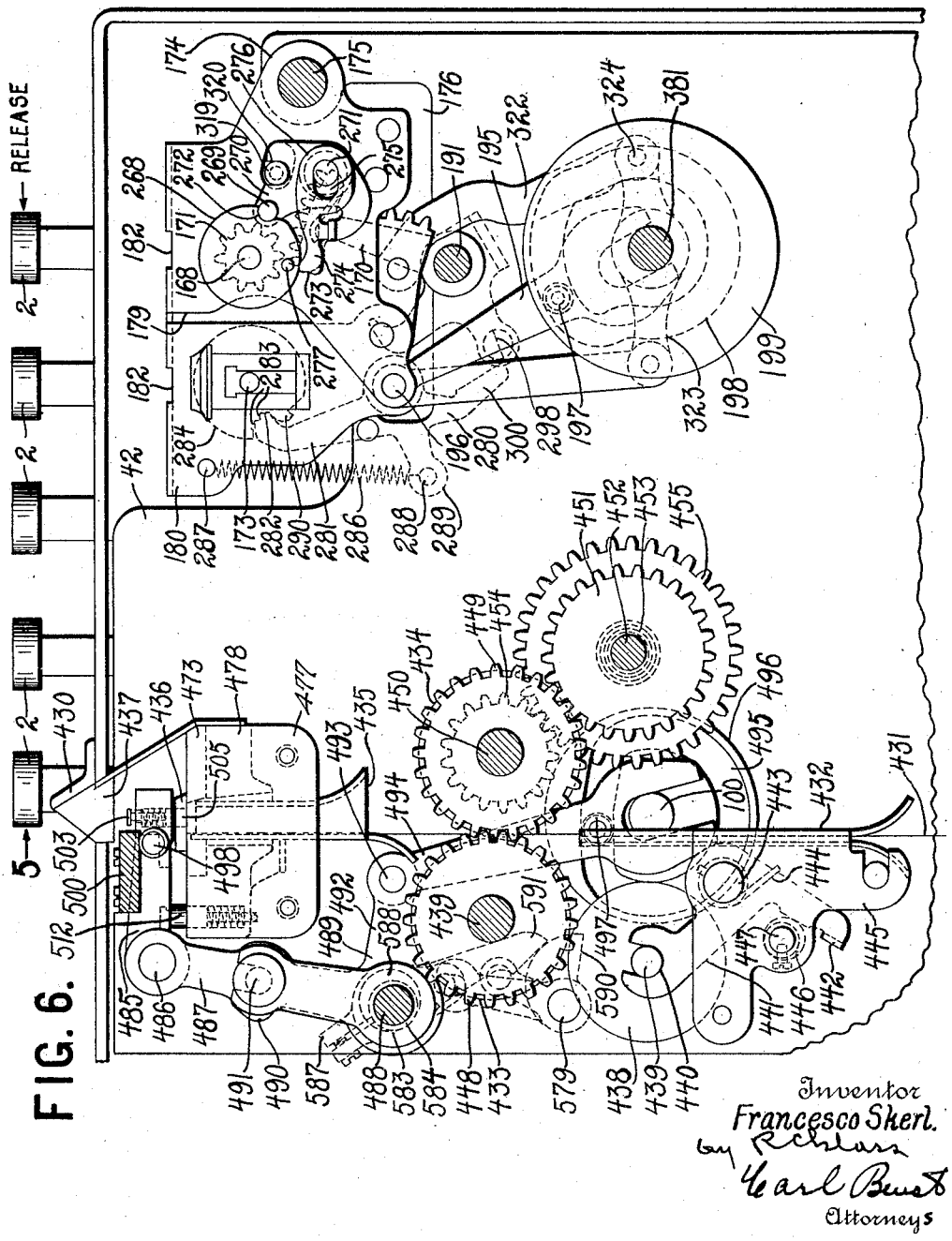

F. SKERL.
TICKET ISSUING ACCOUNTING MACHINE.
APPLICATION FILED JUNE 14, 1915.
1,290,381.
Patented Jan. 7, 1919.
11 SHEETS—SHEET 7.
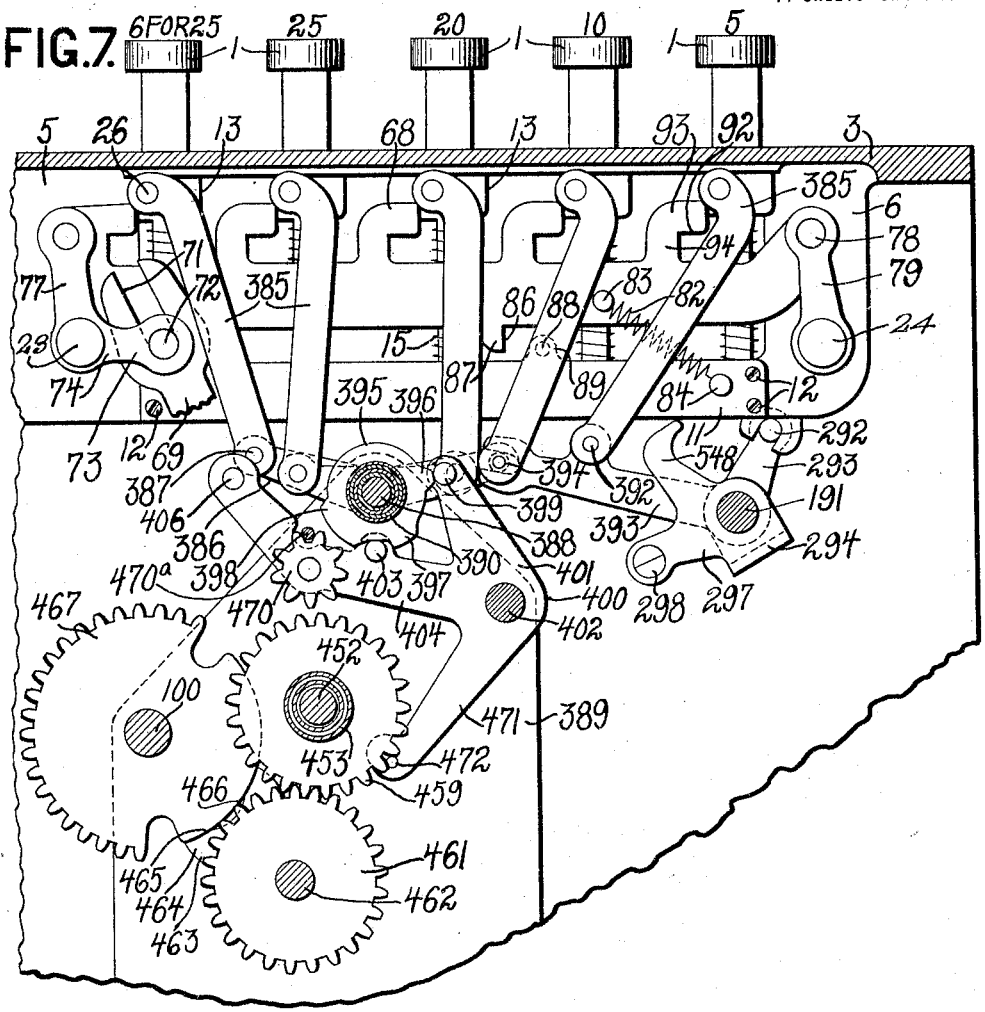
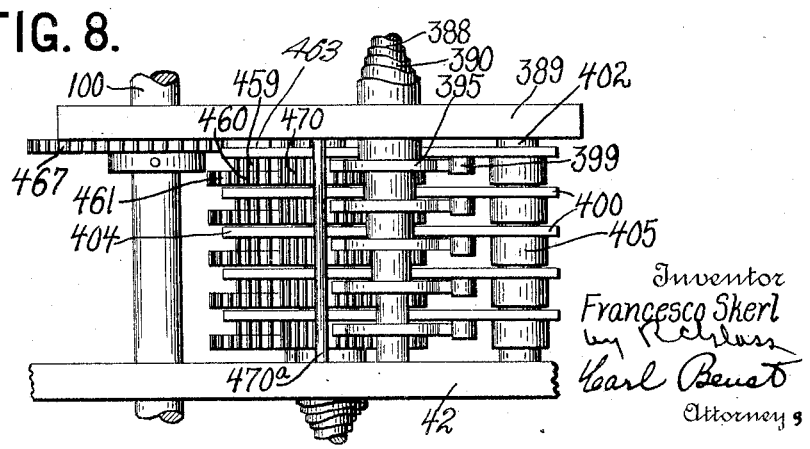
Inventor
Francesco Skerl
by Carl Benat
Attorneys

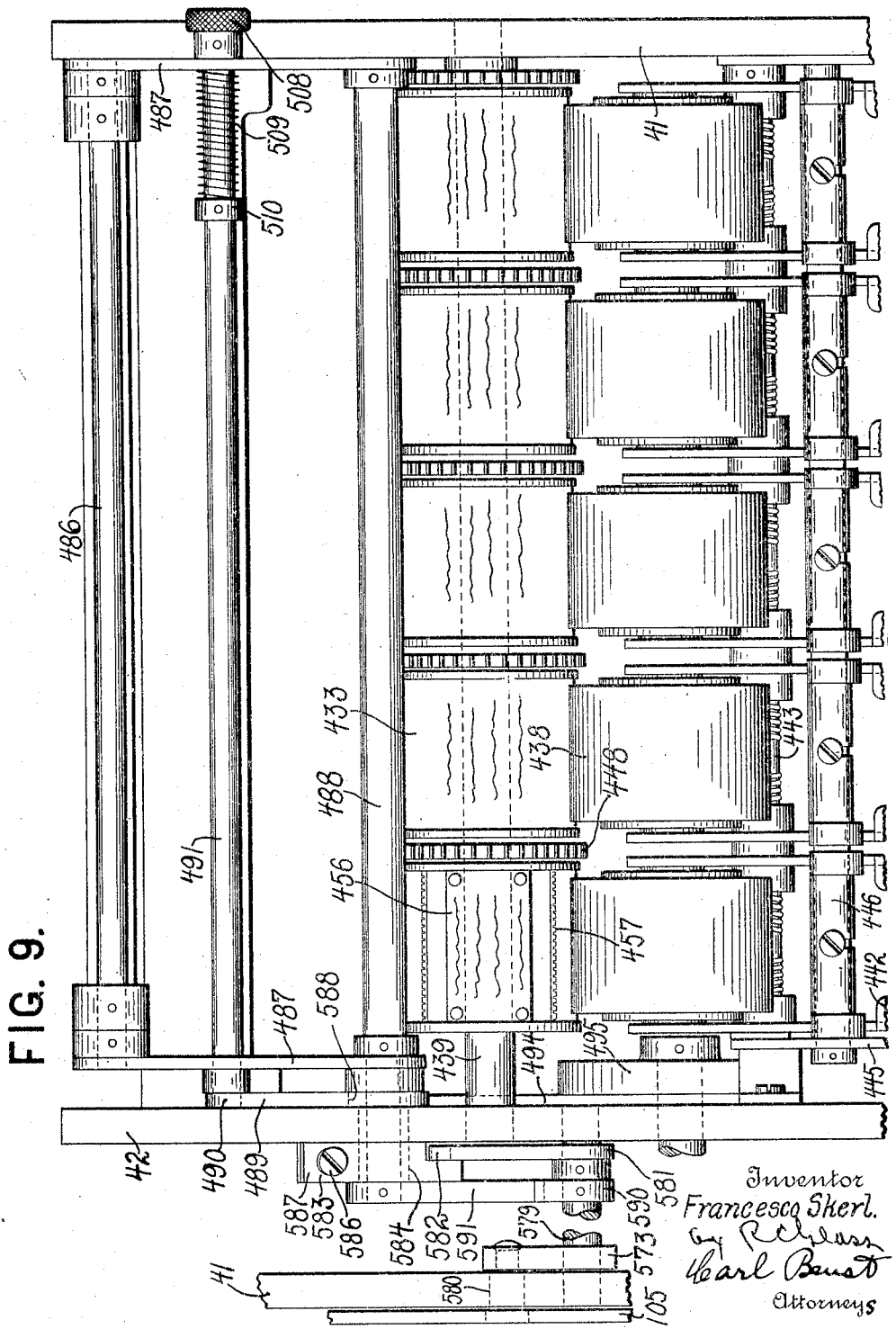

F. SKERL.
TICKET ISSUING ACCOUNTING MACHINE.
APPLICATION FILED JUNE 14, 1915.
1,290,381.
Patented Jan. 7, 1919.
11 SHEETS—SHEET 9.
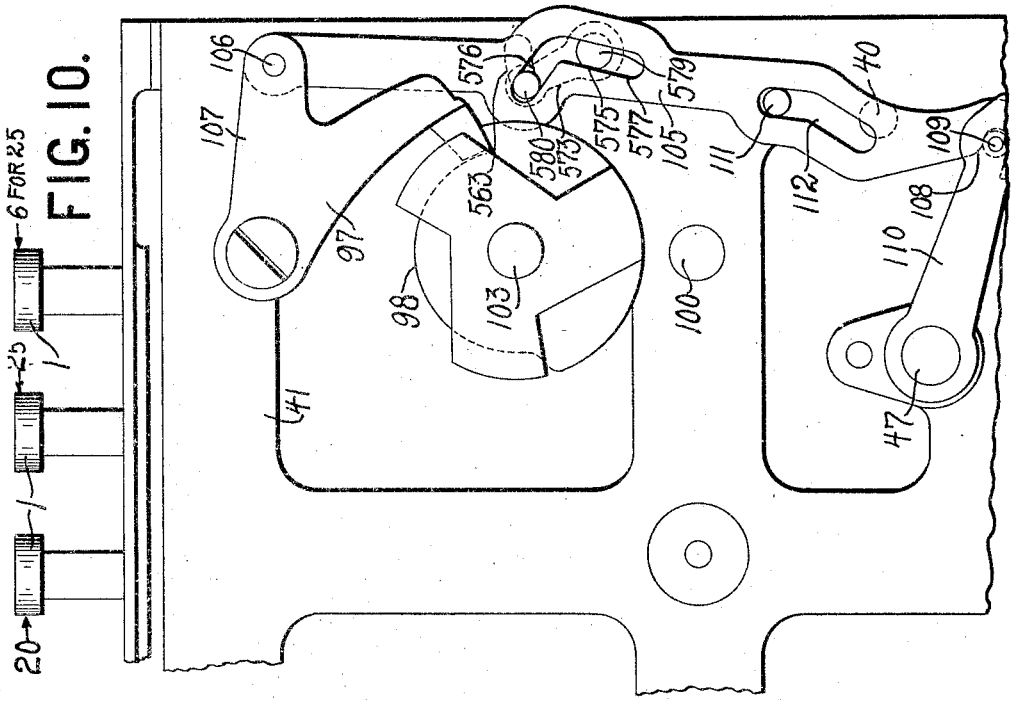
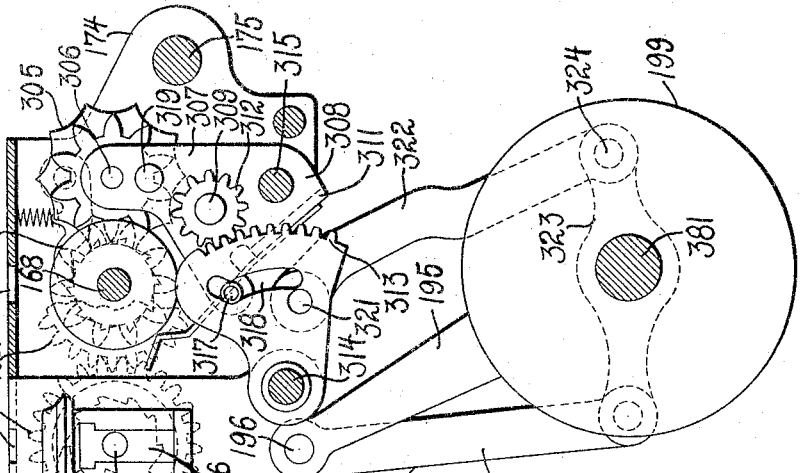
Inventor
Francesco Skerl.
Attorneys

F. SKERL.
TICKET ISSUING ACCOUNTING MACHINE.
APPLICATION FILED JUNE 14, 1915.

1,290,381.

Patented Jan. 7, 1919.
11 SHEETS—SHEET 10.

Inventor
Francesco Skerl.
Carl Beust
Attorneys

F. SKERL.
TICKET ISSUING ACCOUNTING MACHINE.
APPLICATION FILED JUNE 14, 1915.

1,290,381.

Patented Jan. 7, 1919.
11 SHEETS—SHEET 11.

Inventor
Francesco Skerl.
Carl Beust
Attorneys

UNITED STATES PATENT OFFICE.

FRANCESCO SKERL, OF DAYTON, OHIO, ASSIGNOR TO THE NATIONAL CASH REGISTER COMPANY, OF DAYTON, OHIO.

TICKET-ISSUING ACCOUNTING-MACHINE.

1,290,381.     Specification of Letters Patent.     Patented Jan. 7, 1919.

Original application filed November 20, 1913, Serial No. 802,101. Divided and this application filed June 14, 1915. Serial No. 33,990.

*To all whom it may concern:*

Be it known that I, FRANCESCO SKERL, a citizen of Austria, residing at Dayton, in the county of Montgomery and State of Ohio, have invented certain new and useful Improvements in Ticket-Issuing Accounting-Machines, of which I declare the following to be a full, clear, and exact description.

This invention relates to ticket issuing machines and more particularly to that class adapted to issue one or more tickets of various denominations at one operation of the machine.

All of the patentable subject matter disclosed in this application is not claimed herein, this application being a division of an application for United States Letters Patent filed Nov. 20, 1913, Serial No. 802101.

One of the chief sources of loss to the proprietors of theaters, moving picture shows, museums, exhibits, circuses and the like, of base ball parks and attractions at amusement parks, and also in ticket offices of elevated, subway and other railways as well as other transportation systems, and in fact wherever tickets or checks are sold and used is the dishonesty practised by ticket sellers in reselling tickets which have been used. To prevent such dishonesty of the ticket seller, separate ticket takers are usually employed but it has been found that this is not always an effectual check upon the ticket seller as the employee who collects the ticket can by collusion with the seller return them to the latter who can again sell them. This can be readily done without great danger of detection as the tickets are usually printed and although the tickets are ordinarily consecutively numbered yet no means of registering the number of tickets sold and resold is employed so that so long as the money turned over by the seller to the proprietor represents the value of the tickets sold but once as evidenced by the difference between the number of the first ticket sold at the beginning of the day and the number of the ticket left on the ticket roll at the end of the day's business, the proprietor is unable to discover whether the seller has been dishonest in reselling used tickets or not. Various other methods have been devised to prevent such dishonesty, but most of them are defective inasmuch as they leave a channel by which the proprietor can be defrauded either by one of his employees or by the purchasers.

A few ticket machines have been constructed which are designed to prevent such dishonesty but some of these machines are adapted to issue one or more tickets of but one denomination while others have been designed to issue but one ticket of different denominations at one operation of the machine. Both of these classes of machines have been more or less effective in preventing the reselling of tickets and in retaining records of the business done in the machine, but as many of the places of business, such as those enumerated above, sell tickets of different denominations and also one or more to one purchaser at a time, a machine which issues a ticket of but one denomination or but one ticket does not completely fulfil the requirements of such business as the use of the former limits the tickets to one value while the use of the latter requires a distinct and separate operation of the machine for every ticket issued to a purchaser whether he buys one or more tickets at the same time.

The principal object, therefore, of this invention is to provide a machine so as to eliminate as far as possible the loss occasioned by the reselling of used tickets and also so that a desired number of tickets of a desired denomination can be promptly obtained by the purchaser at a single operation of the machine.

It was a further object of this invention to compel operation of manipulative means controlling the number of tickets to be issued first and subsequently the operation of manipulative means controlling the denomination of the ticket to be issued when more than one ticket of the desired denomination is to be issued at one operation of the machine. Operation of the latter means without a preceding manipulation of the former causes the machine to issue but one ticket at a single operation. Such a construction in which the manipulative means for determining the number of tickets to be issued at one operation is not operated when one ticket only is desired, renders the operation of the machine simpler and the cost of construction cheaper than if the machine was designed so that manipulative means controlling the number of tickets to be issued had to be adjusted to issue a single ticket.

Another object of this invention is to embody in such a machine novel mechanism for issuing a definite number of tickets at a reduced price in consideration of the patron purchasing such a number of tickets at a single purchase. In the preferred form this novel mechanism is constructed to issue six 5¢ tickets for twenty-five cents but of course it is clear that the machine could be easily designed to issue any definite number of tickets of any denomination, at a reduced price, the mechanism shown in the drawings as being adapted to issue six tickets for a quarter being for illustrative purposes only.

It is too an object of this invention to embody in such a machine novel mechanism for printing the tickets as they are issued thereby eliminating the carrying of large numbers of valid tickets which might at any time be stolen and used.

Yet another object is to provide in a machine in the preferred form a printing and issuing mechanism for each denomination of tickets so that a different color ticket roll can be used for each denomination. Such a construction is of decided advantage as the ticket taker if there is one, or the ticket seller if no ticket taker is employed and the fare box is used in which the purchaser drops his ticket, can readily discern the denomination of the ticket without taking time to see the printed denomination thereon. Such a system is of peculiar value in the latter case, that is when a fare box or other receptacle is used. Such fare boxes usually have a glass displayer so that the ticket taker or seller can see that the proper ticket has been inserted in the box and if all the tickets were of the same color but of different denominations it would be necessary to print the amount on both sides of the tickets as the latter are often inserted upside down so that the printed amount cannot be seen, when the ticket is printed on but one side. Even by printing the value of a ticket on both sides the value of the ticket is not so readily seen as when the different colored tickets are issued from different ticket rolls.

Another object of the invention is to provide a novel device for partially severing the ticket strip between the tickets as they are issued at a single operation of the machine and completely severing the last ticket from the strip. By the employment of such a device the purchaser can easily withdraw his tickets attached to one another from the machine, still enabling the purchaser or ticket taker to readily and neatly detach the tickets from one another.

Still another object of the invention is to embody in such a machine totalizing and counter mechanisms with improved actuating devices whereby the value of all of the tickets issued by the machine is accumulated, the number of tickets of each denomination is separately registered, the total number of tickets is registered in a single counter and the number of times the counters for separately registering the number of tickets issued are turned to zero is registered.

Other objects of the specific constructions disclosed are to prevent the operation of the machine until one of the keys determining the denomination of the tickets to be issued is depressed, and for temporarily retaining one of the keys determining the number of tickets to be issued in depressed position until one of the keys determining the value of the tickets is depressed, after which the operated keys in both series are locked in their depressed position until near the end of the operation of the machine. Before one of the amount keys is depressed a depressed key controlling the number of tickets to be issued can be released by operation of a release key. A novel device is also shown for preventing the turning to zero of the daily totalizer after an amount key is depressed, and a mechanism is disclosed for positively alining transferring devices for the totalizers.

With these and incidental objects in view, the invention consists in certain novel features of construction and combinations of parts, the essential elements of which are set forth in appended claims, and a preferred form of embodiment of which is hereinafter described with reference to the drawings which accompany and form part of the specification.

Fig. 3$^a$ is a perspective view of an alining device for the transfer elements of the daily totalizer.

Fig. 4 is a transverse vertical section taken along the line Y—Y of Fig. 1, looking in the direction of the arrows, with some of the mechanism removed to show more clearly the device controlling the number of tickets to be issued by the machine.

Figure 2:
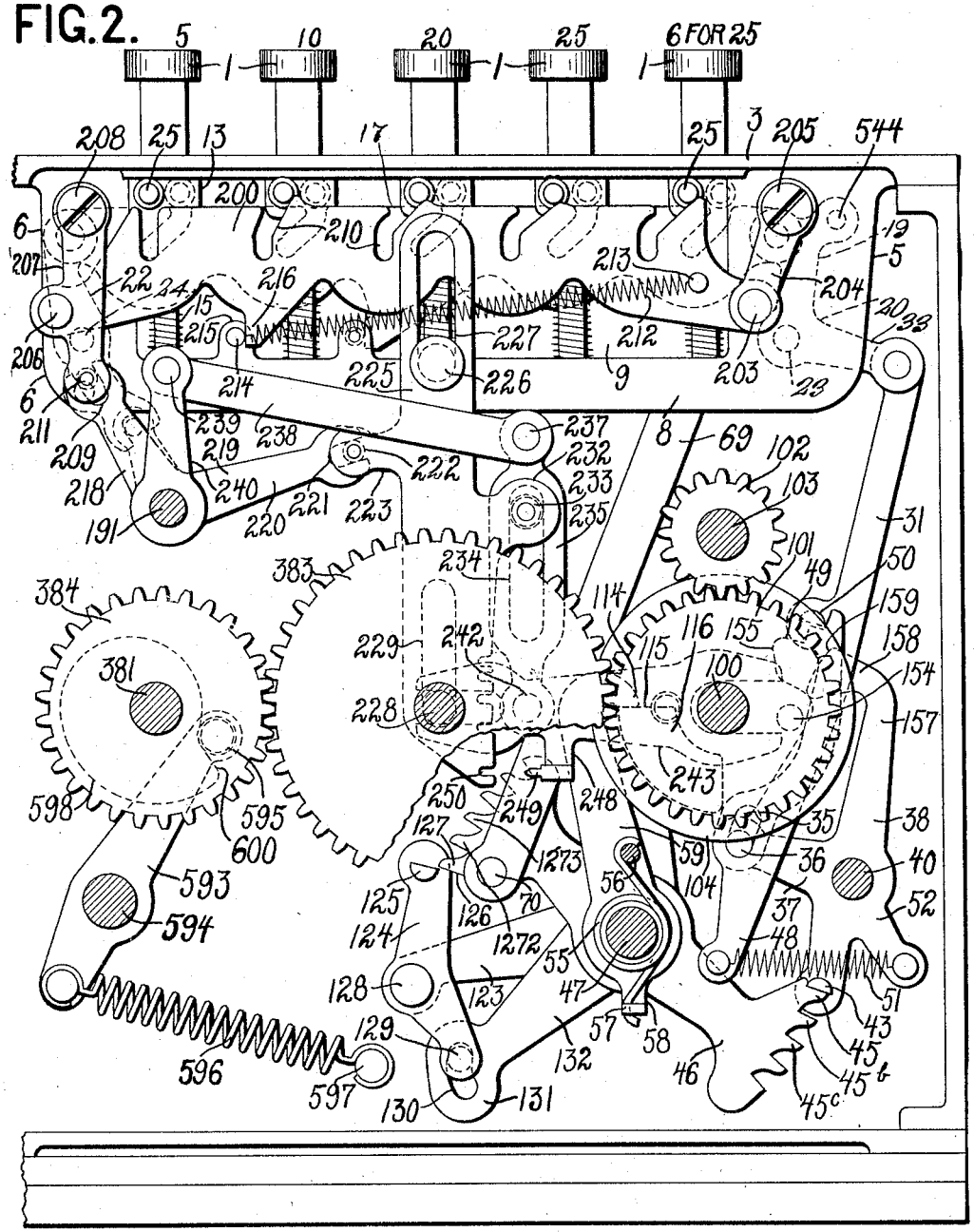
Fig. 2 is a transverse vertical section taken just within the right hand end of the machine looking to the left and showing the differential mechanism and the machine locking mechanism controlled by the keys in the amount or denomination bank and also showing the main driving connections.

Fig. 5, like Fig. 2 is also a transverse vertical section taken just within the right hand side frame of the machine, with the driving connections, and also the mechanism controlling the differential position of the actuators for the totalizers shown in Fig. 2 removed.

Fig. 6 is a left hand side elevation of the machine with the left hand side frame for the machine removed to expose the ticket printing and issuing mechanisms more clearly to view, and with the grand totalizer removed to show the daily totalizer.

Fig. 7 is a detail view of the bank of amount or denomination keys and the mechanism controlled thereby for selectively connecting the desired ticket issuing device to the main operating mechanism.

Fig. 8 is a top plan view of the selecting mechanism shown in Fig. 7.

Fig. 9 is a rear elevation of the printing and issuing mechanisms shown in Fig. 6.

Fig. 10 is a detail view of parts of the motor clutch and the connections from the motor locking arm to the differential mechanism controlling the variable operation of the motor.

Fig. 11 is a detail view of the daily totalizer employed to accumulate the value of the tickets issued, and of the grand ticket counter employed to register the total number of tickets issued.

Fig. 12 is a detail view of the device employed to positively lock the transfer means for the grand and daily totalizer from operation while the machine is not in operation and to aline the transfer means after the totalizers have been actuated.

Figure 13:
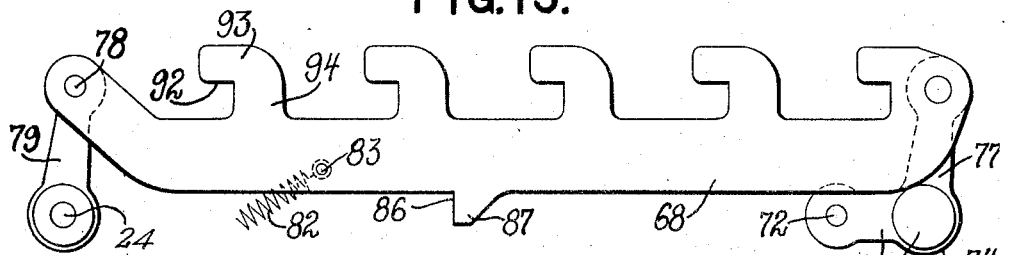
Figure 14:
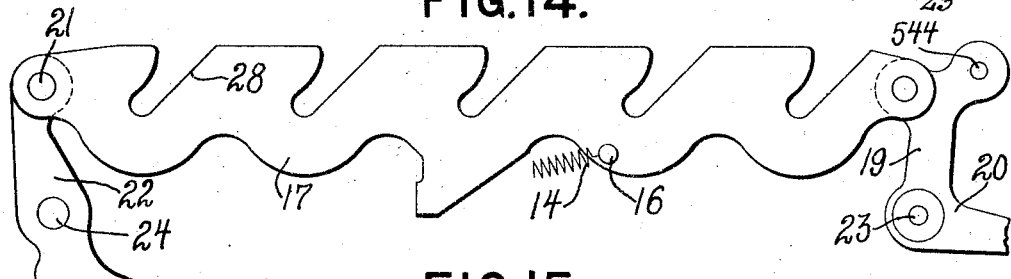

Figs. 13 and 14 respectively are detail views of a detent and plate employed to lock the amount or denomination keys in operated or depressed positions, and to disable a device normally locking the machine against operation.

Figure 15:
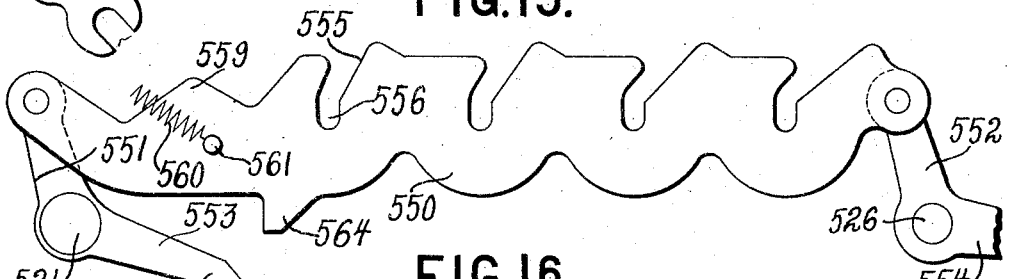
Figure 16:
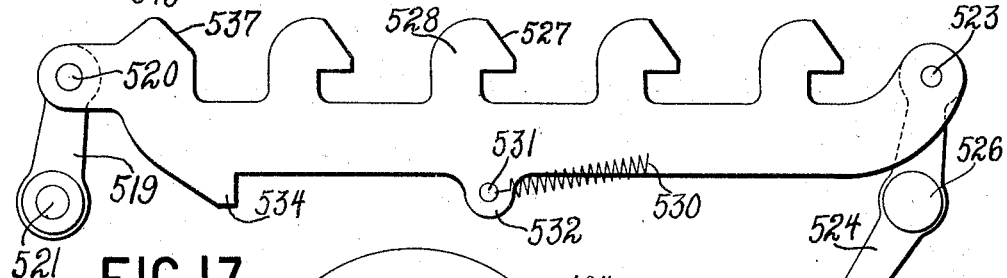

Figs. 15 and 16 respectively are detail views of a plate and detent employed to determine the number of tickets to be issued at each operation of the machine and to temporarily retain the depressed number key in depressed position until the beginning of the operation of the operating mechanism.

Figure 17:
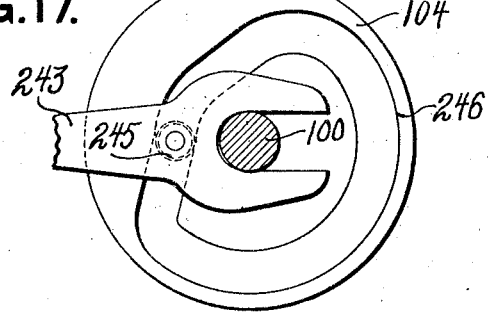

Fig. 17 is a detail view of a cam and pitman employed to operate the actuators for the totalizers.

Figure 18:
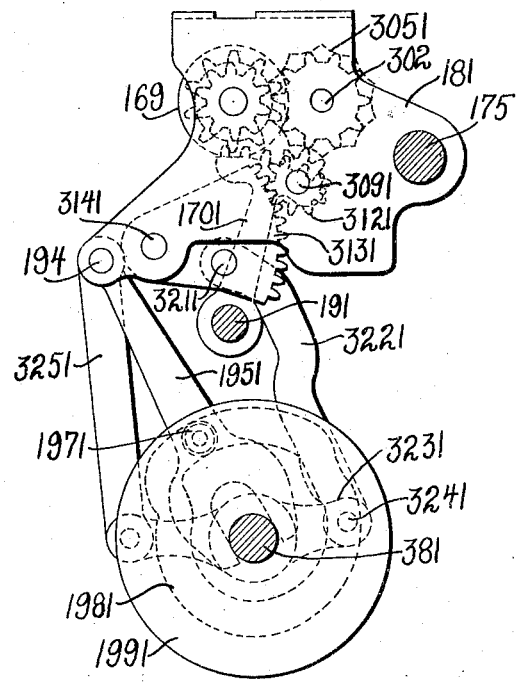

Fig. 18 is a detail of the grand totalizer.

Figure 19:
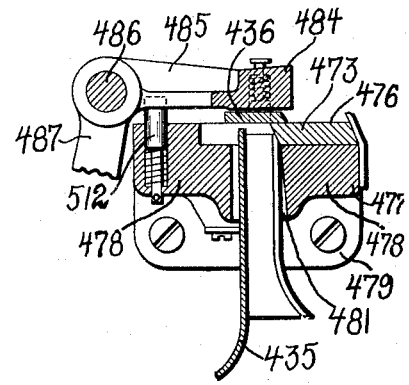

Fig. 19 is a detail view showing the severing knife edges for the tickets and their respective supporting frames in cross section.

Figure 20:
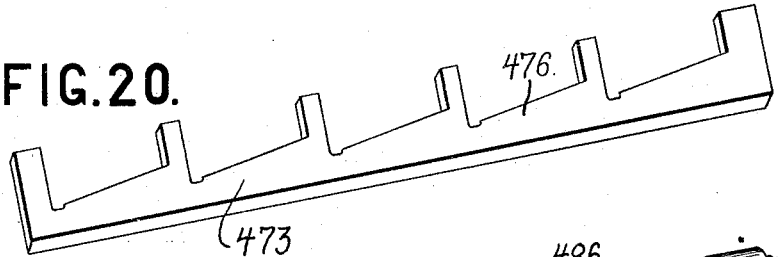
Figure 21:
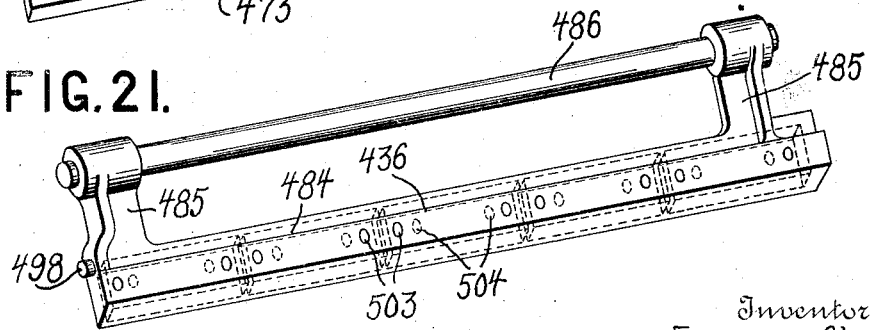

Figs. 20 and 21 respectively are perspective views of the stationary knife edges and of the movable knife edges carried by their supporting bar.

The specific embodiment of the invention shown in the drawings is illustrative only as the invention is equally applicable to other types of accounting machines. The invention as shown in the preferred form is applied to a ticket machine intended when in use to be suitably placed so that the tickets issued will be accessible to the customers and not to the operator of the machine, thus bringing about a condition which would make noticeable attempts to defraud by reselling used tickets. For instance, the machine may be placed in the window of a ticket office so that the tickets as they pass through the top of the cabinet near the rear of the machine will extend through a hole or slot in the window of the ticket office so that only the purchaser can remove the tickets, a hood or chute being provided on the cabinet to prevent the operator from reaching the tickets by means of his finger or any instrument inserted between the opening in the cabinet and the hole in the window. The machine is designed to issue tickets through the top of the cabinet instead of through the rear as in some businesses, such as circuses and side shows, tickets are sold from high platforms and it is necessary for the ticket sellers to remove the tickets from the machine and hand them to the customer and conditions may also exist in other businesses in which it is desirable for the operator to handle the tickets in which cases the machine is positioned so that the operator has access to the tickets as they are issued.

The machine is equipped with a key for each denomination in which the tickets are issued. These keys are arranged in a bank or series and will be referred to herein as "amount" or "denomination" keys. To operate the machine when only one ticket is desired, the operator need only press the proper amount key, the machine then automatically printing and issuing the ticket of the desired denomination, and operating a grand and daily totalizer according to the value of the ticket, a total ticket counter employed to register the total number of tickets issued, and individual ticket counters, one for each key, employed to register the number of tickets of the same value issued.

There is an additional bank or series of keys, one for each number of tickets that the machine is designed to issue at one operation of the latter, and the keys in this bank will be called the "ticket" or "number" keys.

Depression of a number key in the preferred form permits actuation of a detent plate for temporarily retaining the key in depressed position and also moves a reciprocating plate differentially. This latter plate is connected to a lever carrying a stop the extent of differential movement of which determines the extent of movement of a spring actuated member. The amount key representing the value of the tickets to be issued is then operated and such operation actuates a plate to an invariable extent and permits actuation of detents for locking the depressed keys in both the amount and number banks in depressed position until near the end of the operation of the machine. The plate moved an invariable extent by the amount keys is normally connected to the above mentioned spring actuated member and prevents movement of the member, and movement of this plate by the key disables such connections so that the spring actuated member is rocked into engagement with the previously positioned stop. An arm for normally locking the machine against operation is connected to this spring actuated member and movement of this latter member as just mentioned moves the locking arm differentially out of locking position. When the amount key has been depressed the crank handle, if the machine is to be so operated, is turned and the operating mechanism given a number of cycles of movement depending on the number of tickets to be issued. If a motor is employed to drive the operating mechanism, the locking lever for the clutch connections of the motor, also being moved by the spring actuated member, will control the extent of operation of the motor and thus determine the number of cycles of movement of the operating mechanism. Upon each cycle of movement of the operating mechanism a ticket is fed, printed and severed by a ticket issuing device and the locking arm is returned one step toward its locking position. When the last ticket has been issued the locking members are rendered effective to prevent an operation of the machine until an amount key is again operated at the next operation of the machine.

A plate is also differentially moved when an amount key is operated and as the plate is connected to a sliding member, the differential movement of the plate is imparted directly to the sliding member. This latter member has an anti-friction roller which plays in a slot formed in an oscillatory lever and serves as a fulcrum for the lever which is connected to a shaft which carries actuating racks for the totalizers. Upon every cycle of movement of the main operating mechanism the lever is oscillated and as the fulcrum of the lever has been moved differentially by the amount key depressed the extent of movement of the actuating rack at every cycle of movement will be commensurate to the value of the depressed amount key.

The machine in the preferred form of embodiment is designed to print tickets of four different denominations, namely, 5¢, 10¢, 20¢ and 25¢ tickets and also six 5¢ tickets for a quarter. It is of course to be understood that a machine can be constructed in accordance with the present invention to issue tickets of any denominations, the denominations of the tickets shown in the drawings being merely used for illustrative purposes.

A separate printing and issuing mechanism for each denomination as well as for the "six for a quarter" tickets is provided, as it is desired that the machine issue different colored tickets. Each of these printing devices is normally disconnected from the main operating mechanism; but each amount key is connected to a device for connecting only the printing mechanism corresponding to the key depressed with the main operating mechanism. Upon each cycle of movement of the main operating mechanism one ticket of the desired denomination when a 5¢, 10¢, 20¢ or 25¢ ticket is desired, is issued by its respective printing and issuing mechanism. Six 5¢ tickets for a quarter, however, are issued by the corresponding printing device at a single cycle of movement of the main operating mechanism.

An amount key when depressed also selectively connects the operating mechanism to its respective individual counter, there being one counter for each amount key, so that as each ticket of any denomination is issued one will be added on the counter for that denomination.

Amount keys.

Figure 1:
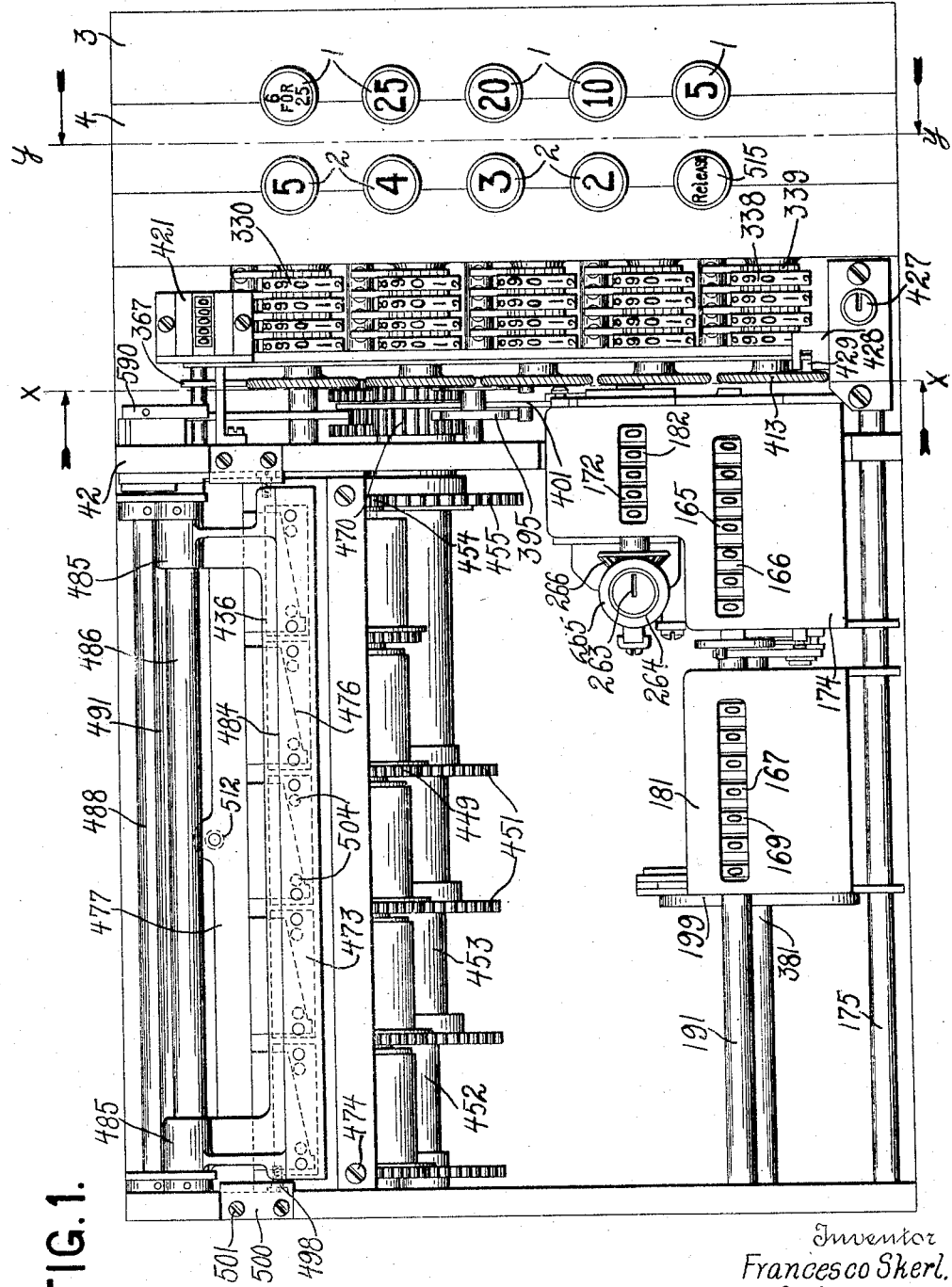
Figure 1 is a top plan view of a machine constructed in accordance with the invention shown herein, with the cabinet removed to expose the mechanism of the machine to view.

The above description briefly points out the general features of the machine constructed in accordance with the invention. The details appear in the drawings in which 1 represents the amount or denomination keys for determining the denomination of the ticket or tickets to be issued and 2 represents the number keys which determine the number of tickets to be issued. As shown in Fig. 1, these keys are arranged in two rows or banks at the right hand side of the machine and the bank of amount keys is to the right of the number keys. As the machine is designed to issue but one ticket upon operation of an amount key when no number key is operated, the various mechanisms of the machine and their operation when only an amount key is operated will be first described and then the devices controlled and operated by the number keys for causing a variable duration of operations of these mechanisms when a number key as well as an amount key is operated will be taken up in detail.

The amount keys are slidably mounted in ways or notches cut in the left hand edge of a plate 3 which extends across the top of the right hand side of the machine. The right hand edge of a plate 4, which is constructed similarly to the plate 3, contacts with the left hand edge of this latter plate to retain the keys in their ways or notches. The plate 3 and arms 5 and 6 (Fig. 2) projecting downwardly from the lower surface of the plate near its rearward and forward ends respectively and connected at their lower ends by a bar 8, form a frame having a rectangular opening 9 and these parts are preferably cast in one piece of metal. The horizontal bar 8 of this frame on its left hand side is provided with vertical slide ways or guides 10 (Fig. 5) in which the lower ends of the amount keys engage to guide the keys in their vertical movements. A plate 11 (Fig. 7) of approximately the same length as the horizontal bar 8 is fastened by screws 12 to the left hand side of the bar 8 to prevent any lateral movement of the lower ends of the keys in their respective slide ways or guides 10. The keys are equipped with shoulders 13 which normally engage the under surface of the plate 3 to limit outward movement of the keys 1. Springs 15 coiled about the shanks of the keys and under compression between the bar 8 of the key frame and the shoulders 13 of the keys serve to retain the keys in their normal undepressed positions and also serve to return the keys to these positions upon being released near the end of the operation of the machine.

*Machine and key locking mechanism.*

A complete depression of an amount key releases a motor locking lever to permit the motor to operate the machine and also causes movement of a detent for locking the depressed key in its operated position and for preventing an operation of the other keys in the bank during an operation of the machine, and the mechanism by which these results are accomplished will now be described. A movable plate 17, shown in detail in Fig. 14 and in assembled position in Fig. 5, is pivotally connected at its rear end to the vertically extending arm 19 of a bell crank lever 20, and the opposite end of the plate 17 is connected at 21 to the upper end of a lever 22. As shown in Fig. 5 the bell crank lever 20 is pivoted by a pin 23 to the left hand side of the arm 5 of the key frame and the lever 22 is pivoted at 24 to the other arm 6 of the key frame. Each key is provided with two pins 25 and 26 and one of these pins designated by the character 26 is shown in dotted lines in Figs. 2 and 5 and projects laterally from the left hand side and near the rear of the shoulder 13 on its respective key and the other pin 25 projects from the right hand side and near the front of the shoulder so that the axes of the pins are in different vertical planes. When a key is depressed the pin 26 on the left hand side of the shoulder of the key engages the inclined edge 28 of the notch 29 in the plate 17 and as the respective notches 29 under the pins 26 on the keys are similarly constructed and inclined inwardly and downwardly, the depression of any one of the amount keys moves the plate 17 forwardly the same extent swinging the levers 20 and 22 about their pivots. The plate 17 is moved against the tension of a spring 14 connected at 16 to the plate and at the opposite end to a stud 18 projecting from the horizontal bar 8 of the key frame. The engagement of the downwardly extending projection 34 on the lower edge of the plate with the stud 18 prevents the spring 14 from pulling the plate past normal position.

Movement of this plate in the manner just described effects the unlocking of the machine through the following described mechanism. A link 31 (Figs. 2 and 5) is pivoted at 32 to the outer end of the horizontally extending arm 33 of the bell crank lever 20 and at its lower end the link has a slot 35 into which a pin 36 projecting from an arm 37 passes. The arm 37 forms part of a multi-armed member 38 which is loosely mounted on a rod 40, carried by the right hand side frame 41 (Fig. 10) and a central supporting frame 42, (Fig. 1) which comprises a solid plate mounted on the base of the machine. The plane face of a lug 43 which projects from the free end of a downwardly projecting arm 44 of the member 38 is normally in engagement with the upper plane face of the uppermost projection 45 on the rear end of a lever 46 which is fast to a shaft 47 supported by suitable bearings in the right hand side frame 41 of the machine and the central frame 42. An arm or lever 48 is loosely mounted on the arm 37 by the pin 36 and at its upper end has two shoulders 49, the upper one of which is normally held under the plane face of a stud 50 projecting laterally from the central portion of the link 31, by the spring 51 which is under tension between the lower end of the arm 48 and an arm 52 of the multi-armed member 38. When one of the amount keys 1 is depressed the plate 17 as described is moved forwardly, rocking the bell crank lever 20 about its pivotal center 23. Such movement of the bell crank lever 20 through the link 31 and the arm 48 forming a positive connection between the link 31 and the multi-armed member 38, rocks the member 38 counter-clockwise as viewed in Figs. 2 and 5 to carry the lug 43 out of engagement with the projection 45 on the rear end of the lever 46. The lever 46 is then rocked counter-clockwise by a spring 55 (Fig. 2) coiled about the shaft 47, one end of the spring being bent around a stud 56 projecting from the right hand frame of the machine 42 while the other end of the spring is bent about a lug 57 projecting laterally from a downwardly extending portion 58 of a locking arm 59 which is also rigidly mounted on the shaft 47.

A stepped member 61 (Fig. 4) is also rigidly mounted on the shaft 47. The construction of this stepped member will be more fully described hereinafter and it will be sufficient to say here that the uppermost stop or step 62 is normally one step of movement of the member 61 from a plate 63 which is rigidly fastened to the lower end of a downwardly extending arm 64 of a bell crank lever 65 which is loosely mounted on the rod 40 and is adapted to be differentially adjusted by the number keys 2 in a manner to be described later. When but one ticket is to be issued this lever 65 is not moved from normal position as no number key is operated so that when an amount key is operated and the lug 43 (Figs. 2 and 5) is taken out of engagement with the upper face of the uppermost projection 45 on the rear end of the lever 46, the spring 55 coiled about the shaft 47 will move the shaft 47 and the stepped plate or member 61 and the lever 46 rigid with the shaft 47 one step in a counter-clockwise direction, and this one step of movement is limited by the engagement of the first stop 62 of the stepped member 61 with the plate 63 on the bell crank lever 65.

Movement of the lever 46 from normal position in the manner just described permits movement of a locking detent 68 (Figs. 5, 7 and 13) to lock the depressed amount key in operated position until near the end of the operation of the machine and also to lock the other keys against operation. A link 69 which is pivoted to the forward end of the lever 46 by a pin 70 has an elongated notch 71 (Figs. 5 and 7) and the lower end of the notch normally engages a pin 72 projecting from a forwardly extending arm 73 of a bell crank lever 74 pivoted at 23 to the amount bank key frame. The outer end of the upwardly extending arm 77 (Figs. 7 and 13) of the bell crank lever 74 pivotally supports the locking detent 68 for the amount keys. The forward end of the detent 68 is loosely connected by a pin 78 to the upper end of an arm 79 pivoted on the pin 24. A spring 82, which is under tension and connected at one end to a pin 83 on the detent and at the other end to a pin 84 on the key frame, tends to draw the plate forwardly, but such movement of the detent is prevented by the link 69, which, when the lever 46 is in its normal position, holds the bell crank lever 74 and therefore the detent 68 against forward movement. When, however, an amount key is operated and the lever 46 is rocked counter-clockwise by the spring 55 the lower end of the notch 71 in the link 69 is carried downward out of engagement with the pin 72 on the bell crank lever 74 to permit the spring 82 to draw the detent 68 forward until such movement is limited by the engagement of the vertical edge 86 of a projection 87 on the lower edge of the detent with the pin 18 projecting from the bar 8 of the key frame. Upon movement of the detent 68 the lower edge 92 of the horizontal portion 93 of one of the projections 94 on the detent passes over the pin 26 of its respective key, if the key is operated, to retain the key in depressed position and the upper edges of the horizontal portions of the other projections 94 pass below the pins 26 of their respective keys to prevent the operation of these keys during the operation of the machine.

Only part of the clutch connections for the electric motor are shown in the drawings (Fig. 10), it being considered sufficient to state in this application that the motor locking arm 97 normally engages a clutch member 98 and that movement of the arm from locking engagement permits operation of the clutch member and causes simultaneous closing of the motor circuit so that the motor will operate the main drive shaft 100. The clutch connections shown in Fig. 10 are the same as those forming part of the motor fully shown and described in the present applicant's application Serial No. 766,054, filed May 7th, 1913, and for a full description of the same reference may be had thereto.

The main drive shaft 100 is rotated by the engagement of a gear wheel 101 (Fig. 2) rigidly mounted on it with the gear wheel 102 having one-half as many teeth as the gear wheel 101 and rigidly mounted on the shaft 103, which in turn is driven by the motor clutch. To move the locking arm 97 out of engagement with the clutch connections of the motor, a link 105 (Fig. 10) is pivotally connected at its upper end by a pin 106 to a projecting portion 107 of the arm 97 and at its lower end the link is provided with a notch 108 in which a roller 109 plays, the roller being mounted on the free end of an arm 110 rigidly mounted on the end of the shaft 47 on the outside of the side frame 41 of the machine. A stud 111 projecting from the side frame 41 of the machine extends into a slot 112 in the link 105 to guide the link in its movements. By this construction it is evident that when the shaft 47 is rocked counter-clockwise by the spring 55 upon depression of an amount key the arm 110, being also fast to the shaft, will be given a like movement and through the link 105 raise the motor locking arm 97 out of engagement with the clutch connections to permit an operation of the motor. Another locking arm 59 (Fig. 2) is also provided to prevent an operation of the machine until a key is depressed in case it is desired to operate the machine by a crank instead of by a motor. It is clear that a crank could be readily employed as, for example, by rigidly attaching it to the shaft 103. The upper end of this arm 59 carries a projection 114 and the lower edge of this projection normally engages the upper edge 115 of a block or plate 116 which is rigidly mounted to the side of a disk 104 rigidly mounted on the shaft 100. When the shaft 47 is rocked by the spring 55 the projection 114 of the arm 59 is moved out of engagement with the plate 115 and permits rotation of the drive shaft 100 upon which the gear wheel 101 is rigidly mounted.

The depressed key is not released and the machine locking arm 59 and the motor locking arm 97 are not returned to normal locking position until near the end of the operation of the machine, but as the operating mechanism effects the release of a depressed key and the restoration of these locking members to normal position through the mechanism just described, this operation of the mechanism may be described here. A bell crank lever 118 (Fig. 5) carries at the upper end of its vertically extending arm 119 an anti-friction roller 120 which engages in a cam groove 121 formed in the face of a disk 122 rigidly mounted on the drive shaft 100. The other arm 123 (Figs. 2 and 5) of the lever 118 carries at its outer end a small lever 124 centrally mounted on a pin 128. From the upper end of the lever 124 laterally projects a stud 125 which is semi-cylindrical in shape and its plane surface is normally out of the path of movement of but almost in the same plane as the lower plane edge 126 of the lowermost projection or stop 127 on the forward edge of the lever 46 so that when the lever 46 is rocked one step in a counter-clockwise direction and just before movement of the lever 118 is effected, as will be described, the stud 125 will be just one step of movement above the lowermost projection 127. The lower end of the lever 124 carries an anti-friction roller 129 playing in a slot 130 in an enlarged portion 131 formed on the outer end of an arm 132. The arm 132 forms part of a lever 133 which is loosely mounted on the shaft 47. The slot 130 is eccentric with the shaft 47 and the upper end of the slot with which the roller is normally in contact is nearer the shaft than is the lower end of the slot. The upwardly extending arm 135 (Fig. 4) of the lever 133 is equipped with a roller 136 and the roller works in a cam groove 137 formed in the face of a disk 138 also rigidly mounted on the main drive shaft 100.

The operation of the above described mechanism for returning the machine locking lever 59 and the motor locking arm 97 to normal position and for moving the locking detent 68 out of locking position with the amount keys is as follows: Depression of an amount key as already explained moves the plate 17 rearward (Fig. 5) and because of the engagement of the shoulder 49 with the stud 50 on the link 31 the multi-armed member 38 is rocked counter-clockwise to carry the lug 43 on the arm 44 of the member 38 out of engagement with the uppermost projection 45 on the rear end of the lever 46. The locking arm 59 engaging the plate 116 and the locking arm 97 for the motor, upon movement of the shaft 47, are rocked with the shaft out of locking position and their movement is limited by the engagement of the uppermost stop 62 (Fig. 4) of the stepped plate 61 rigid on the shaft 47 with the plate 63 on the lever 65 which has not been moved when but one ticket is to be issued. Simultaneously with the releasing of the machine the motor circuit is closed and the main drive shaft 100 is given one complete rotation in a clockwise direction, but one rotation being required for a complete operation of the machine when but one ticket is to be issued. During approximately the first half of rotation of the drive shaft 100 the bell crank lever 118 carrying the centrally pivoted lever 124 and the lever 133 provided with the slot 130 in which the roller 129 on the lever 124 engages are not moved by their respective cams 121 and 137 as the roller 120 (Fig. 5) on the arm 119 of the lever 118 plays in the concentric portion 141 of its cam groove while the roller 136 (Fig. 4) on the arm 135 of the lever 133 rides in the concentric portion 142 of its cam groove 137. While the roller 120 is passing into the eccentric portion 143 of its cam groove 121, the lever 118 is rocked counter-clockwise so that the plane surface of the lug 125 on the lever 124 is carried into the same relative position with the lower edge of the lowermost projection 127 on the forward end of the lever 46 that it is when these levers are in normal position and in this position it will be remembered that the plane surface of the stud 125 is slightly lower than the lower edge of the projection 127. During this counter-clockwise movement of the lever 118, the roller 136 on the lever 133 is playing in the eccentric portion 145 of its cam groove 137 and as this portion of the cam 137 is nearly like the eccentric portion 143 of the cam groove 141 the levers 118 and 133 are moved nearly as a unit so that the engagement of the pin 129 on the lower end of the lever 124 with the upper edge of the eccentric slot 130 in the lever 133 is maintained. The roller 120 on the lever 118 then plays in the second concentric portion 146 of its cam groove 121 and the lever 118 is held stationary during this period, but as the roller 136 on the lever 133 is at this time working in the eccentric portion 148 of its groove 137, which rocks the lever 133 clockwise, the lever 133 is given a movement relative to the now stationary lever 118 so that the lower end of the slot 130 is carried up into contact with the pin 129 on the lever 124. As the slot 130 in the lever 133 is eccentric to the shaft 47, the lever 124 is rocked in a clockwise direction and the lug 125 is thereby carried under the projection 127 of the positioned lever 46. When the roller 120 on the lever 118 works in the eccentric portion 150 of its cam groove 121 and the roller 136 works in the eccentric portion 151 of its cam groove 137, the levers 133 and 118 are rocked in a clockwise direction so that the lever 46 and therefore the shaft 47 are rocked to normal position. As the locking arm 59 is fast to the shaft and the motor locking arm 97 is connected to the shaft 47 by the arm 110 and link 105, they are restored to normal locking position on restoration of the shaft 47 to normal position. Finally the lever 135 is given a reverse movement, that is, in a counter-clockwise direction relative to the lever 118 so that the lever 124 is rocked in a counter-clockwise direction through the slot 130 and pin 129 to carry the lug 125 out of engagement with the lowermost projection 127 on the forward end of the lever 46.

Simultaneous with the rocking of the lever 124 so that the stud 125 is taken out of engagement with the projection 127 on the lever 46 the multi-armed member 38 is restored to normal position so that the lug 43 on the arm 44 of the member 38 is again brought into engagement with the plane surface of the uppermost projection 45 on the rear end of the lever 46 in order to retain the lever 46 in normal position until the next operation of the machine. To accomplish this purpose a stud 154 (Fig. 2) projecting from the side of the disk 104 engages an inclined face 155 on the upper end of the arm 48 and forces the arm rearward so that the upper shoulder 49 of the arm 48 is carried out of engagement with the lug 50 on the link 31. The rocking of the multi-armed member 38 to initial position by the spring 51 is then permitted with the depressed key remaining in operated position as the pin 36 on the arm 37 of the member 38 by reason of the upper shoulder 49 of the arm 48 having been thrown out of engagement with the lug 50 can be moved out of engagement with the lower end of the slot 36 in the link 31 and into engagement with the upper end of the slot. To make such return movement of the member 38 positive the upwardly extending arm 157 of the member 38 is provided with a projection 158 having an inclined edge 159 so that the stud 154 will engage the edge 159 after the upper shoulder 49 of the arm 48 is carried out of engagement with the lug 50, and thereby positively restore the lug 43 on the member 38 to its locking position over the projection 45 on the lever 46.

The restoration of the lever 46 to normal position in the manner just described raises the link 69 so that the lower end of the notch 71 (Fig. 7) in the upper end of the link engages the stud 72 in the bell crank lever 74 which supports one end of the locking detent 68 and moves the detent rearward to carry the projections 94 out of the path of movement of the pins 26 on the amount keys to permit the depressed key to be returned to undepressed position by its spring 15 and the detent is held out of locking position by the link 69 and lever 46 until the next operation of the machine.

It will be remembered that in order to permit the rocking of the multi-armed member 38 to initial position with the depressed key remaining in operated position the upper shoulder 49 of the arm 48 is drawn out of engagement with the lug 50 on the link 31. After the multi-armed member 38 and the arm 48 are brought to initial position the lower shoulder 49 of the arm 48 will just touch the lug 50 without restoring the link 31 to normal position. The restoration of link 31 to initial position takes place when the amount key is returned to undepressed position when the bell crank lever 20 is rocked counter-clockwise (Fig. 5) raising the link 31, after which, under the action of the spring 51, the upper shoulder 49 will be brought under the lug 50. It will be seen from this that the depressed key must first be returned to undepressed position before the machine can again be operated. The mechanism whereby the keys are released so that they may be returned to undepressed position by their springs has already been described.

*Accumulating mechanism.*

The mechanism for accumulating the value of the tickets issued by the machine comprises two totalizers which are adapted to be brought into and out of engagement with actuating segment gears. These two totalizers as shown represent a daily totalizer 166 and a grand totalizer 167 (Figs. 1 and 18), the daily totalizer being arranged to be reset to zero at the end of each day or for any other period of time, while the grand totalizer is arranged to run on indefinitely. Associated with the daily totalizer is a total ticket counter for registering the total number of tickets issued by the machine from the last resetting operation of the daily totalizer. In the entering of amounts on the totalizers, both of them are constructed to be moved simultaneously into engagement with their respective actuating segments 170 and 1701 (Figs. 6 and 18) after the latter have been positioned, such engagement being maintained until the actuating segments are returned to normal position, after which the totalizers are returned to their normal position out of engagement therewith. The totalizer elements 165 (Figs. 1 and 11) of the daily totalizer are constructed similarly to the totalizer elements 169 of the grand totalizer 167 (Figs. 1 and 18) and the construction and operation of these elements of the two totalizers is the same except that the grand totalizer cannot be reset to zero. The totalizer elements of the daily totalizers are loosely mounted on a shaft 168 (Figs. 6 and 11) carried in a frame 174. The registering wheel of the lowest order is actuated directly by the actuating segment gear 170 which is adapted to engage the pinion 171 (Fig. 6) integral with this totalizer wheel and this wheel is provided with alternate "0" and "5" and is arranged to transfer to the wheel of next highest order at each second unit of movement, the wheels of higher order transferring after each complete rotation. Carrying operations from wheels of lower order to wheels of higher order are accomplished by the well known Geneva stop mechanism as indicated in Fig. 11. The totalizer elements 169 (Figs. 1 and 18) for the grand totalizer 167 which is carried in a frame 181 are similarly constructed and are actuated by an actuating rack 1701 constructed similarly to the actuating rack 170 for the daily totalizer. The registering elements 172 (Fig. 11) of the total ticket counter employed for registering the number of tickets issued are loosely mounted on a shaft 173. The shafts 168 and 173 are carried by the frame 174. This frame is constructed of one plate or sheet of metal and is pivoted at its rear end on a rod 175 which extends between the end frames of the machine. The frame is arranged to swing vertically in an opening 176 (Fig. 6) formed in the central frame 42 of the machine. The right hand side of this auxiliary frame is all in the same vertical plane and forms a right angle with the top of the frame. The portion 179 of the left side of the frame is parallel to the right side of the frame and supports the left hand end of the shaft 168. The portion 180 of the left side of the frame is also parallel to the right side of the frame but is not in the same vertical plane as the portion 179, the distance between the right side of the frame and the portion 180 being less than that between the right side of the frame and the portion 179 as shown in Figs. 1 and 6. The portion 180 of the frame supports the left hand end of the shaft 173 which carries the accounting elements 172 employed to register the number of tickets issued. Sight openings 182 are provided in the top of the totalizer frame so that the amounts accumulated on the totalizer elements may be readily seen. The totalizer elements 169 for the grand totalizer 167 are also mounted in an auxiliary frame 181 (Figs. 1 and 18) which is mounted on the shaft 175 in the same manner that the auxiliary frame 174 is mounted thereon and the frame 181 differs from the frame 174 only in that it has no portion similar to the portion of the frame 174 supporting the registering elements 172 of the grand ticket counter as no ticket counter is associated with the grand totalizer.

The accounting elements 172 for registering the number of tickets issued are actuated by the engagement of the graduated teeth 184 (Fig. 11) arranged in a manner well known in the art, on a common pawl 185, with the ratchet wheels 186, one of which is integral with each registering wheel, whereby when one wheel is given a complete rotation the wheel of next higher order is moved one degree or step. This pawl 185 is pivotally mounted on a stud 188 which projects from the left hand side of the central frame 42 and the spring 189 coiled about the stud 188 and bent at one end about the lower end of the pawl 185 and engaging at the other end a stud 190, maintains the engagement of the teeth 184 on the pawl with the ratchets 186.

The actuating gears 170 and 1701 (Figs. 6 and 18) for the daily totalizer and grand totalizer respectively are rigidly mounted on a shaft 191 which extends longitudinally through the machine. After the segment gears 170 and 1701 have been differentially positioned by the amount keys in a manner to be presently described the daily totalizer and the grand totalizer frames are rocked about their pivotal shaft 175 so that the pinion 171 rigid with the registering wheel of the lowest denomination of each of these totalizers is rocked into engagement with the teeth of its actuating segment gear and the segment gears are then restored to normal position and thereby impart their differential settings to the registering wheels of the totalizers and finally the totalizers are carried out of engagement with the actuating segments upon the return movement of the totalizer frames to normal position. The means by which the totalizer frames are rocked as just stated is shown most clearly in Figs. 6 and 18. A pitman 195 is pivoted at 196 to the totalizer frame 174 carrying the daily totalizer and a similar pitman 1951 is connected at 194 to the grand totalizer frame 181, and at the lower ends of the pitmen are rollers 197 and 1971 playing in their respective cam grooves 198 and 1981 of box cams 199 and 1991 rigidly mounted on the shaft 381. The shaft 381 is given one complete rotation upon each rotation of the main drive shaft 100 through the large intermediate gear 383 (Fig. 2) which is loosely mounted on a stud 228 on the right hand machine frame and meshes with the gear wheel 101 on the main drive drive shaft and also with a gear wheel 384 rigidly mounted on the shaft 381. Near the beginning of the operation of the machine but after the actuating segment gears 170 and 1701 have been differentially adjusted the pitmen 195 and 1951 are simultaneously drawn downwardly by their cams 199 and 1991 and the totalizer frames 174 and 181 in this manner are swung about their pivotal center 175 so that the pinion 171 of the totalizer wheel of lowest denomination in each totalizer meshes with its actuating segment gear 170 or 1701. This engagement is maintained until near the end of the operation of the machine and after the actuating segment gears 170 and 1701 have been restored to normal position, then the cams 199 and 1991, through the pitmen 195 and 1951 carry the totalizer frames 174 and 181 back to normal position.

The grand ticket counter mounted on the shaft 173 is employed to accumulate the total number of tickets issued by the machine and has, of course, one added to the previous amount on the counter each time the totalizer carrying frame 174 is rocked downward, by the engagement of the ratchet wheels 186 of the counter elements with the teeth 184 of the common actuating pawl 185.

The actuating segment gears 170 and 1701 as above described are rigidly mounted on the shaft 191 and the shaft is rocked differentially by the main operating mechanism, the extent of differential movement being controlled by the amount keys 1. As shown in Fig. 2 a plate 200 is connected at 203 to the lower end of an arm 204 which is pivoted at 205 to the right hand side of the arm 5 of the amount key frame and at its forward end the plate is pivoted by a pin 206 intermediate the ends of an arm 207 which at its upper end is pivoted by a screw 208 to the arm 6 of the key frame. The pins 25 which project from the right hand side of the shoulders 13 of the keys coöperate with downwardly and forwardly inclined slots 210 formed in the upper edge of the plate 200. The slots 210 are differentially inclined so that depression of the keys will move the plate rearward to different extents swinging the arms 204 and 207 counter clockwise about their pivots. The slot under the 5¢ key is not inclined so that depression of this key does not move the plate 200 but locks the plate 200 from movement. The slot adapted to coöperate with the pin 25 on the "six for a quarter" key, which is the last key from the front of the machine, and the slot adapted to coöperate with the pin 25 on the 25¢ key have the same inclinations as the amount to be added on the daily totalizer and the grand totalizer when either of these keys is operated, is the same. A spring 212 connected at one end by a pin 213 to the plate 200 and at its opposite end to a pin 214 projecting from the projection 215 on the horizontal bar 8 of the key frame tends to retain a projection 216 on the lower edge of the plate 200 in contact with the pin 214 and also serves to return the plate 200 to normal position after the operated key has been moved to normal undepressed position near the end of the operation of the machine. The arm 207 at its lower end carries an anti-friction roller 211 which engages in an elongated notch 209 formed in the outer end of an arm 218 of an L-shaped lever 219 loosely mounted on the shaft 191. The other arm 220 of this lever 219 is also provided with an elongated notch 211 in which plays an anti-friction roller 222 which projects laterally from a projection 223 formed on the forward edge of a vertical sliding bar 225 intermediate the ends of the bar. A stud 226 projecting from the key frame passes through a slot 227 in the upper end of the bar 225 and the stud 228, passes through a similar slot 229 in the lower end of the sliding bar to guide the bar in its vertical movements which are imparted to it by the amount keys through the plate 200 and the lever 219. As shown the studs 226 and 228 are slightly restricted where they pass through the respective slots 227 and 229 so that the sides of the restricted or grooved portions of the studs prevent movement of the plate longitudinally of the shaft. It is evident that by this construction when an amount key is operated the bar 225 will be slid differentially downward through the plate 200 and the lever 219 an extent commensurate to the value of the operated key.

On the rear edge of the bar 225 and intermediate its ends is a projecting portion 232 carrying the anti-friction roller 233. This roller plays in a slot 234 formed in an oscillatory lever 235 and serves as a fulcrum for the lever 235 when the latter is moved by the operating mechanism. The lever 235 at its upper end is connected by a pin 237 to the rear end of a link 238 (Fig. 2). At its forward end the link is pivoted by a pin 239 to an arm 240 fast to the shaft 191 to which the actuating segment gears 170 and 1701 are also fast. The lower end of the oscillatory lever 235 is pivoted at 242 to a pitman 243. The pitman is forked at both ends and the forward end straddles a restricted portion of the shaft 228, while the rear end straddles the main drive shaft 100, the notches or openings between the forked ends of the pitman being sufficiently deep to permit reciprocation of the pitman by the cam disk 104 (Fig. 17). It will be seen in this figure that the pitman 243 at its rear end carries an anti-friction roller 245 which plays in the cam groove 246 of the disk 104. The configuration of the groove 246 is such that at the beginning of the operation of the machine the pitman 243 (Fig. 2) will be given a forward movement and retained in such position for approximately one-half of the rotation of the drive shaft and finally restored to normal position near the end of the operation of the machine. The lower edge of the pitman 243 is provided with a projection 248 carrying an alining tooth 249 which, when the pitman is thrown forward, engages in one of the alining notches 250 on the rear edge of the sliding bar 225 to lock the sliding bar in its differentially adjusted position until the pitman is restored to normal position near the end of the complete rotation of the drive shaft 100.

From this description it is clear that depression of an amount key, through the differentially movable plate 200 and the bell crank lever 219, will lower the sliding bar 225 differentially and in this manner the anti-friction roller 233 carried by the sliding bar and serving as a fulcrum for the oscillatory lever 235 will be differentially positioned in the slot 234 of the lever. Upon subsequent rotation of the main drive shaft 100 by the motor or a crank the lower end of the lever 235 being pivoted to the pitman 243 will be given an invariable extent of movement, but the upper end of the lever will be moved to different extents dependent upon the position of the roller 233 in the slot 234 of the lever 235. As the upper end of the lever 235 is connected by the link 238 and the arm 240 to the shaft 191 upon which the actuating segment gears 170 and 1701 are rigidly mounted, it is obvious that the differential movement of the upper end of the lever 235 will be imparted to the actuating segment gears 170 and 1701. After the actuating segment gears have been differentially positioned the totalizer carrying frames for the grand totalizer and the daily totalizer are swung downward to mesh the totalizer pinions with their actuating segment gears 170 and 1701 and then both of these actuating segment gears are restored to normal position and finally the totalizers are rocked back to normal position out of engagement with their actuating segment gears 170 and 1701.

The device employed to turn the totalizer elements 166 of the daily totalizer 165 and the register elements 172 of the ticket counter to zero position is one well known in the art and is shown in Figs. 6 and 11. In general the device consists of two intermeshing gears 260 and 261 fast to the right hand ends of the totalizer shafts 168 and 173 respectively so that when a key is inserted into the key seat 263 (Fig. 1) in the lock 264 mounted on the outside of the portion 180 of the totalizer carrying frame 174 and turned, the shafts 168 and 173 are turned by the engagement of a small bevel gear 265 on the lock 264 with a small bevel gear 266 near the left hand end of a shaft 173. Interposed between the registering wheels 165 and 172 on the totalizer shaft 168 and counter shaft 173 respectively are pawls (not shown herein but of well known form) suitably constructed to pick up the wheels at different points at which the wheels may be standing and turn them to zero as these shafts are rotated. A disk 268 (Fig. 6) is fast to the totalizer shaft 168 and when the shaft is rotated a pin 269 on an arm 270 on a stud 271 on the totalizer carrying frame is forced out of normal engagement with the notch 272 formed in the periphery of the disk 268. The slightly recessed end 273 of a pawl 274 which has a slot 275 through which the stud 271 passes and which is connected to the arm 270 by a spring 276 coiled about the stud 271, is rocked into the path of a pin 277 projecting laterally from the face of the disk 268 so that when the totalizer wheels reach zero position the pin 277 abuts the end 273 of the pawl 274 and prevents further rotation of the wheels. The pawl 274 is then returned to its initial position by the spring 276 coiled about the stud 271 and the pin 269 on the arm 270 again engages the notch 272 formed in the disk 268.

In order to prevent the registering wheels of the daily totalizer and the ticket counter from being turned to zero after an amount key has been depressed and before the key has been released, a tri-pronged member 280 is pivotally mounted on the right hand end of the rod 196 of the totalizer carrying frame 174. The outer end of the upwardly extending arm 281 of the member 280 is equipped with shoulders 282 which normally engage with shoulders 283 formed in a nearly circular disk 284 fast to the counter shaft 173 carrying the registering wheels 172 to prevent reverse movement of the totalizer and counter shafts. When the totalizer wheels are turned to zero, the disk 284 being turned in a clockwise direction as viewed in Fig. 6 of the drawings, the arm 281 is rocked rearward against the tension of a spring 286 connected to the totalizer frame by a pin 287 at one end and at the other end by a pin 288 on an arm 289 of the member 280. After the shoulder 290 on the disk 284 is past the first shoulder 282 on the arm 281, the disk cannot be returned in a reverse direction, that is counter-clockwise, because of the engagement of these shoulders. The lower end of the lever 22 carrying one end of the movable plate 17, which is actuated by the amount keys, is bifurcated at its lower end and straddles a pin 292 (Fig. 5) projecting from one arm 293 in a yoke 294 which is loosely mounted on the shaft 191. The other arm 296 of this yoke carries a projection 297 equipped with a semi-circular stud 298. The plane surface of the stud 298, as shown in Fig. 6, is just below the outer end of an arm 300 on the member 280, but when an amount key is depressed the lever 22 is rocked through the plate 17 as described and the yoke 294 in this manner being rocked about its pivot carries the stud 298 in front of the arm 300 of the member 288 so that the disk 284 is locked from movement while a key is depressed as the arm 281 of the member 280 cannot be thrown rearward to permit movement of the disk as such movement is prevented by the engagement of the stud with the arm 300 of the member 280.

Figure 3:
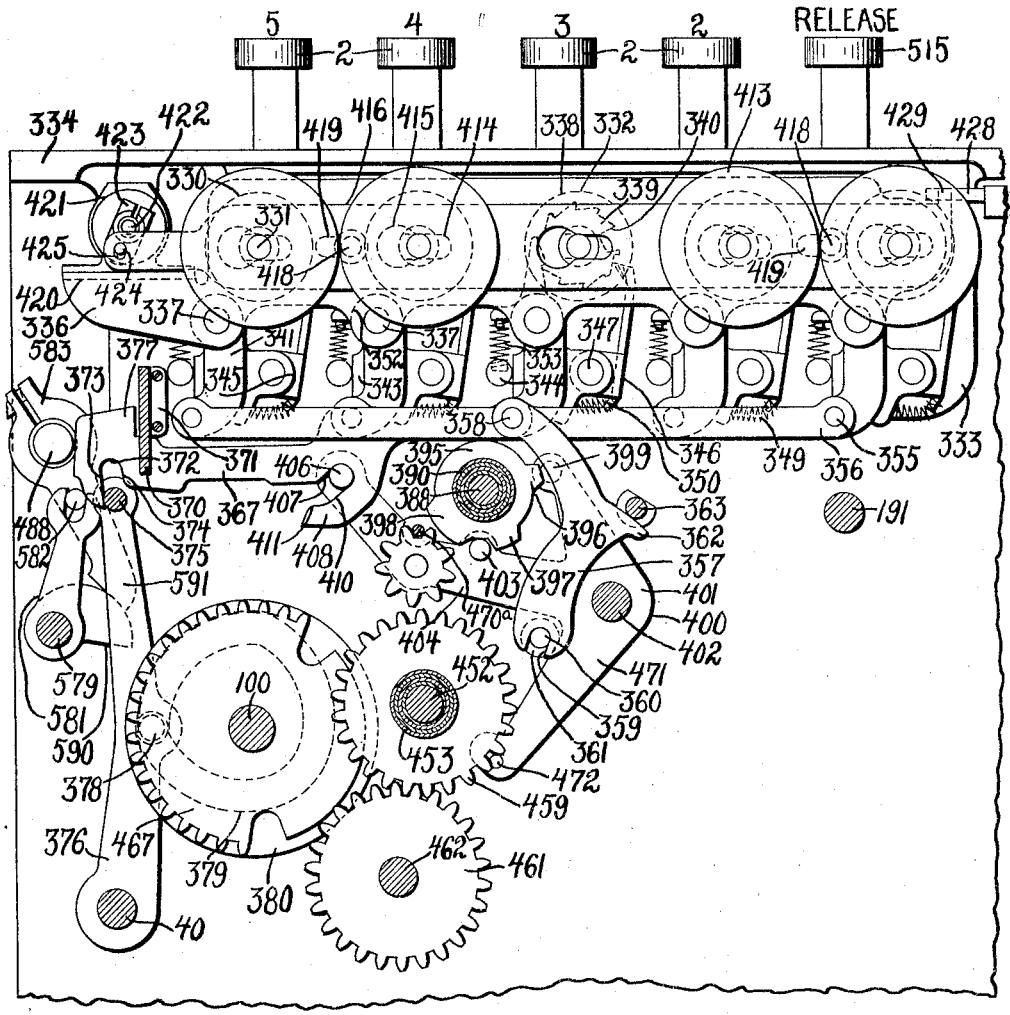
Fig. 3 is a transverse vertical section taken along the line X—X of Fig. 1, and looking in the direction of the arrows.
Figure 3A:
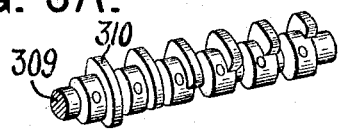

As there is a large number of totalizer elements in the grand totalizer 167 and the daily totalizer 165 and as these totalizer elements in each totalizer are actuated through a single actuating segment gear 170 or 1701 depending on the totalizer, it is possible that the wheels of higher order might not be given their full one step of movement when one should be added upon these totalizer elements, and when there is to be a series of transfers it is desirable that the transfers from one element to the element of next higher order be complete as otherwise the totalizer elements of higher order might sometimes lose a step of movement. To insure complete transfers and aline the totalizer wheels of the daily totalizer in their proper adjusted positions the Geneva stops or star wheels 305 (Figs. 11 and 12) loosely mounted on a shaft 306 which is carried in the side plates 307 of a carrying frame 308 are engaged by a series of projections 310 carried on collars fixed on a shaft 309 (Fig. 3ᵃ). The carrying frame 308 comprises side plates 307 and a connecting bar 311 and this frame carries the shaft 309 and is pivotally mounted on a shaft 315 carried by the totalizer frame. The Geneva stops or star wheels 3051 (Fig. 18) for the grand totalizer are carried on a shaft 302 suitably mounted in the sides of the grand totalizer frame. The stops 3051 are also engaged by projections like the projections 310 and the projections are fixed on a shaft 3091 but this shaft for the grand totalizer is carried in the sides of the grand totalizer frame and not in a yoke as the totalizer elements of the grand totalizer are not to be turned to zero and therefore the star wheels are not rocked out of engagement with the totalizer elements. There is one of these projections 310 and projections on the shaft 3091 for each star wheel in the respective totalizers and the outer peripheries of the projections are concentric with the periphery of their shafts and coact with the scallops in the periphery of their co-acting star wheels, the scallops having the same radius as the concentric peripheries of the projections. These projections are spirally arranged on the respective shafts 309 and 3091, the projections for the star wheel of the totalizer element of lowest denomination of each totalizer being adapted to engage the star wheel of this element before the other projections engage their star wheels when the shafts 309 and 3091 are rocked in a counter-clockwise direction after they have been turned in the reverse direction to the same extent in a manner to be presently described. Each of these projections subtend an angle of about 180 degrees. The left hand end of the shafts 309 and 3091 (Figs. 11 and 18) are respectively provided with pinions 312 and 3121 meshing with a segment gear 313 and 3131 mounted on a shaft 314 and 3141 carried respectively by the totalizer frames 174 and 181. The segment gear 313 for the daily totalizer (but not the segment gear 3131 for the grand totalizer) has a slot 318 the lower portion of which is concentric with the pivot 314 of the segment gear and the upper portion of the slot for a short distance is concentric with the pivot 315 of the yoke 308. An anti-friction roller 317 extending from the right hand plate 307 of the yoke 308 plays in this slot in the segment gear 313, the upper end of the slot being concentric as described, for the purpose of permitting the yoke 308 to be rocked rearward when the totalizer wheels are being turned to zero to carry the star wheels 305 out of engagement with the totalizer elements. The yoke 308 is rocked for this purpose in the usual manner through the engagement of a stud 319 on the yoke with a notch 320 (Fig. 6) formed in the pawl 270 which is rocked by the disk 268 when the latter is turned. The segment gears 313 and 3131 are pivoted at 321 and 3211 to corresponding links 322 and 3221, which, at their lower ends, are pivoted to corresponding levers 323 and 3231 by the pins 324 and 3241. The levers 323 and 3231 are loosely mounted on the rotation shaft 381 and the forward end of the lever 323 for the daily totalizer is connected to the portion 180 of the daily totalizer carrying frame through the link 325 and the forward end of the lever 3231 for the grand totalizer is connected at 194 to the totalizer frame 181 by a corresponding link 3251.

It follows from the above description that when the totalizer frames 174 and 181 are swung downward through the corresponding pitmen 195 and 1951 and cams 199 and 1991 the rear ends of the levers 323 and 3231 will be swung downward thereby raising the forward ends of the levers and through the links 322 and 3221 causing counter-clockwise oscillation of the segment gears 313 and 3131. As the segment gear 313 for the daily totalizer is raised the roller 317 on the yoke 308 enters the lower portion of the slot 318 and as forward movement of the yoke 308 is thereby prevented the totalizer elements cannot be turned to zero, as the rocking of the arm 270 by the disk 268 is thereby prevented. This movement of the segment gears 313 and 3131 through the pinions 312 and 3121 rotates the shafts 309 and 3091 in a clockwise direction, such rocking being sufficient to carry the projections 310 and 3101 on the respective shafts 309 and 3091 out of engagement with the scallop edges of the star wheels 305 and 3051 in each totalizer to permit rotation of the star wheels for the purpose of carrying one from a totalizer wheel of lower order to a totalizer wheel of the next higher order. When the totalizer frames 174 and 181 are subsequently rocked upward to normal position the shafts 309 and 3091 are rotated in a counter-clockwise direction to their initial position. The cam projections 310 and 3101 from lower to higher order successively engage their corresponding star wheels of their respective totalizers and aline the star wheels in their proper position.

*Ticket counters.*

In addition to the daily totalizer 165, the grand totalizer 167 and the total ticket counter 172, a series of step by step counters 330 (Fig. 1) are provided and these counters serve to register the number of tickets of each denomination issued. Each of these individual ticket counters is adapted to be actuated one step as a ticket of the denomination to which the particular counter is assigned is issued, and they are selected for actuation by the amount keys. Beginning from the front of the machine these respective counters are designed to register the number of 5¢, 10¢, 20¢, 25¢ and "six for a quarter" tickets issued.

The shafts 331 (Fig. 3) upon which the counter wheels 332 are loosely mounted are supported at their right hand ends in suitable bearings in a vertical bar 333 projecting downwardly from the under surface of a plate 334 (Figs. 1 and 3). This plate 334 and its downward extending portion 333 forms a frame constructed similarly to the key frames except that the downwardly extending portion 333 is not provided with a rectangular opening 9 as are the key frames. The left hand end of the shafts 331 are supported by bar 336 which in turn is supported by rods 337 projecting from the portion 333 of the frame comprising plate 334 and the portion 333. Each element of the counters consists as usual of a disk 338 (shown in Figs. 1 and 3) rigid with the ratchet wheel 339 having teeth and a deep notch 340. This construction is most clearly shown in Fig. 3 where these parts for the 20¢ counter are shown. The disks for the "six for a quarter" ticket counter also show the numerals from one to nine and as six tickets are issued during a single rotation of the drive shaft when the "six for a quarter" key is operated it is necessary to multiply the total shown by the disks by six to obtain the total of "six for a quarter" tickets issued. Blocks or bars 341 are pivotally mounted on the rods 337 and each bar 341 comprises a casting having a projecting portion 343 on its rear face normally in contact with a corresponding stud 344 projecting laterally from the portion 333 of the frame, and they are equipped with two projecting ears 345 on their front face. The rods 337 pass through the ears 352 projecting from the upper edge of the block. Multi-pronged pawls 346 are pivoted on shafts 347 which are suitably mounted in the ears 345 of the blocks are bars 341. The multi-pronged pawls 346 are of the usual construction having fingers of decreasing lengths, one for each ratchet wheel. Springs 349 under compression between the downwardly extending projecting portions 350 of the pawls and backed by the bars 341 tend to retain the pawls in engagement with the ratchet wheels 339 of their corresponding counter. When a block 341 is rocked forwardly, as will be presently described, a finger of the pawl 346 carried by the rocked block 341 will displace its ratchet wheel one tooth and thereby turn the disk annexed thereto one step. When this disk has been displaced by ten teeth its finger on the pawl will be moved under the influence of the spring 350 into the deep notch 340 of the ratchet and thereby the finger for the disk of next higher denomination will be put into action to turn this latter disk. Retaining pawls 351 mounted on the rods 337 between the ears 352 of the blocks 341 engage the teeth of the ratchet wheels 339 to prevent retrograde movement of the wheels, and the springs 353, compressed between studs 344 projecting from the plate 333 and the projections 366 of the pawls, tend to maintain this engagement of the pawls with the ratchet wheels.

To effect the rocking of a multi-pronged pawl 346 for actuating the counter assigned to the operated key the blocks 341 carrying the pawls 346 are selectively coupled to the operating mechanism by the operated key and subsequent operation of the operating mechanism actuates the selected pawl. For the purpose of rocking the blocks 341 for the 5¢, 10¢, 25¢ and "six for a quarter" ticket counter, each block 341 (Fig. 3) is connected at 355 to a corresponding link 356. The opposite ends of the links are pivotally connected to the upper end of plates 357 by pins 358. There is one of these plates 357 for each link 356 and the block 341 carrying the pawl 346 for the 20¢ ticket counter is pivoted directly to its plate. Only one of these plates 357 can be seen in Fig. 3, but it is to be understood that the four plates to the right of the plate shown are of the same construction, but cannot be seen because they are back of one another. The plate 357 shown in Fig. 3 is connected by the link 356 to the block 341 carrying the pawl 346 for the 5¢ ticket counter. The plates at their lower ends are provided with notches 359 which pass over a rod 360 supported by the right hand end frame of the machine and the central frame 42 and the plates are properly spaced on the shaft by short spacing sleeves 361 surrounding the shaft. Projecting from the rear edge of the plates 357 are projections 362 the upper edges of which are concentric with the shaft 360. The concentric edges of these projections engage a stationary rod 363 and in this manner prevents the plates from being raised bodily upward but permits oscillation of the plates about the shaft 360. Each plate 357 is pivotally connected by the pin 358 to a connecting or coupling bar 367, there being one connecting bar for each plate 357. These coupling bars 367 are swung downwardly about their pivots 358 by their respective keys, as will be presently described. Lateral movement of the plates is prevented by a vertical plate 370 (Figs. 1 and 3) connected by the brackets 371 to the portion 333 of the frame 334 and the central frame 42, the plate being provided with vertical notches (not shown) which pass over the coupling bars 367 near the free end of the bars. Shoulders 377 on the upper edges of the bars 367 are normally above the upper ends of the notches in the plate 370 to prevent forward movement of the coupling bars except when the corresponding key is operated. Each coupling bar 367 near its free end is provided with a notch 372, the rear wall 373 of which is longer than the forward wall 374, and the rear wall is normally in engagement with the tie bar 375 carried at the upper ends of two arms 376 loosely mounted on the rod 40. When one of the coupling bars 367 is swung downward in the manner to be hereinafter described, the notch 372 of the coupling bar engages the tie bar 375 so that the forward wall 374 of the notch is also in engagement with the tie bar. One of these arms 376 as shown in Fig. 3 of the drawings, carries an anti-friction roller 378 projecting into the cam groove 379 formed in the face of a disk 380 which is rigidly mounted on the main drive shaft 100. The shape of this cam groove 379 (Fig. 3) is such that upon each rotation of the shaft the arms 376 are rocked forward and it is evident from this description that this forward movement of the arms 376 and therefore of the tie bar 375 moves the lowered connecting or coupling bar 367, whose notch 372 engages the tie bar 375, forwardly and that such forward movement of the coupling bar through the plate 357 and link 356 rocks the block 341 counter-clockwise to cause the pawl 346 to actuate the counter elements of the counter assigned to accumulate the tickets corresponding to the value of the key depressed.

The means by which the coupling bars 367 are selectively lowered to connect the actuating pawl 346 for the counter assigned for the operated key to the operating mechanism may now be described in detail. Referring to Fig. 7 it will be seen that links 385 are pivoted at their upper ends to their corresponding keys by means of the pins 26. The links for the 10¢, 20¢, 25¢ and "six for a quarter" keys are pivoted at their lower ends to the outer ends of corresponding arms 386 by means of the pins 387. The arm 386 connected to the link 385 for the "six for a quarter" key is fast to a shaft 388 which is journaled at one end in the central frame 42 and passes through the frame 389. The other end of the shaft is supported by a bracket (not shown) projecting from the right hand side of the auxiliary frame 389. The other arms 386 are fast to corresponding sleeves 390 surrounding the shaft 388. As the 5¢ key is farther away from the shaft 388 than are the other keys its link 385 is pivotally connected at 392 to an arm 393 loosely mounted on the rod 191. The arm 393 at its rear end is bifurcated and a pin or roller 394, projecting from the arm 386 fast to the outermost sleeve 390, works in this notch. Each sleeve 390 and the shaft 388, as shown in Figs. 3, 7, and 8 of the drawings, are equipped with nearly circular disks 395 having cam projections 396, 397, and 398. The cam projections 396 are normally in engagement with studs 399 projecting laterally from the upwardly extending arms 401 of the tri-pronged members 400. There is one of these members 400 for each cam disk 395 and they are loosely mounted on a rod 402 supported by the central frame 42 in the machine and the auxiliary frame 389, and are properly spaced from one another by collars 405 on the shaft. Studs 403 (Figs. 3 and 7) on the rearwardly extending arms 404 of the tri-pronged members 400 are normally in engagement with the periphery of their cam disks 395 between the cam portions 397 and 398. Studs 406 on the rear end of the arms 404 of these members 400 are normally in engagement with the end of the notches 407 formed between the lower edge of the coupling bars 367 and fingers 408 projecting from the bars.

When an amount key is depressed the corresponding sleeve 390 or the shaft 388 is rocked through the link 385 and arm 386 fast to the sleeve or shaft to turn the cam disk 396 fast to the sleeve of the shaft. Of course the 25¢ key and the "six for a quarter" key turn their shaft 388 and sleeve 390 respectively in a counter-clockwise direction as viewed in Figs. 3 and 7, and the other keys of the bank turn their sleeves and cam disks 395 in a clockwise direction. Movement of one of the disks 395 serves to take the projection 396 out of engagement with the stud 399 on the upwardly extending arm 401 and at the same time one of the cam projections 397 or 398 engages the stud 403 on the rearwardly extending arm 404 and cams the tri-pronged member 400 downward in a counter-clockwise direction. When the 25¢ key or the "six for a quarter" key is operated the cam projections 398 of the corresponding cam disks 395, the disks being turned in a counter-clockwise direction, engages the stud 403 and as the other cam disks 395 are turned in the reverse direction upon the depression of the other keys the cam projections 397 of the cam disks 395 for these keys engage the studs 403 of the corresponding tri-pronged members 400. When a tri-pronged member 400 is rocked the stud 406 on the rear end of the rearwardly extending arm 404 of the member 400 by engagement with the edge 410 of the finger 408, rocks the coupling bar 367 for the counter corresponding to the key depressed downward about its pivot 358 and at the same time passes into engagement with the upper edge 411 of the horizontal outer end of the finger 408. It has been explained above that the lowering of a coupling bar 367 causes the notch 372 at the forward end of the bar to engage the tie bar 375 so that when the arms 376 supporting the tie bar are rocked by their cam 380 the proper counter will be actuated. When the selected coupling bar 367 is moved forward by the cam 380 the stud 406 being at the end of the finger 408 permits actuation of the coupling bar without effecting the multi-pronged member 400, as then the notch 407 of the coupling bar is carried out of engagement with the stud 406 and when the coupling bar is again pulled rearward the stud again enters the notch. When the depressed key is restored to its normal undepressed position by the spring 15 coiled about its shank after the selected counter is actuated, the links 385 are elevated with the keys and the cam disks 395 are thereby turned back to normal position. As the cam disks 395 are being restored the cam projections 397 or 398 pass out of engagement with the studs 403 on the arms 404 of the tri-pronged member 400 and at the same time the cam projections 396, by engaging the studs 399 on the arm 401 of the member 400, forces the member 400 back to normal position and the members 400 are held in this position until the next operation of the machine.

Interposed between the counter shafts 331 and the registering wheels are suitable pawls (not shown) which are adapted to pick up the registering wheels at their various positions and turn them to their zero position when the shafts are turned. For the purpose of turning the shafts 331 and so restoring the counters to their zero position, each shaft 331 has fast at its left hand end a turn button 413 (Figs. 1 and 3) with a knurled periphery so that the operator may easily turn the buttons with his fingers. In order to prevent an unauthorized turning to zero of the ticket counters the counter-shafts 331 are normally locked against rotation. To this end the walls of the elongated portions 414 of the openings 415 in a transversely movable plate 416 engage the flattened surfaces near the left hand end of the counter shafts. The plate 416 is slidably mounted on pins 418 which project laterally from the plate 336 and pass through the slots 419 in the plate. The rear end of the supporting plate 336 has a horizontal flange 420 upon which is mounted a step by step counter 421 of a well known construction. The shaft 422 upon which the elements of this counter 421 are mounted and through which they are turned, carries an arm 423 provided with a pin 424 passing into the slot 425 in the rear end of the locking plate 416. Each time the plate 416 is moved forward upon the pins 418 the shaft 422 is rocked to add one upon the counter and in this way register the number of times the plates was moved to turn the ticket counters to zero position. When the plate 416 is moved forwardly the elongated portions 414 of the slots 415 are taken out of engagement with the shafts 331 and the enlarged circular portions of the openings permit the turning of the counter shafts 331 by the turn buttons 413. The plate 416 is moved forwardly for this purpose by a key manually turned in a lock 427 (Fig. 1). The bolt 428 (Figs. 1 and 3) of the lock has a recess into which the projection 429 on the upper edge of the forward end of the plate 416 projects. When a key is inserted in the lock and the barrel turned the bolt 428 and therefore the bar 416 are pulled forward to permit the turning of the counter shaft 331.

*Ticket issuing mechanism.*

As stated above, the machine is adapted to print and issue tickets of the different denominations on different colored ticket strips. For this purpose there are five printing mechanisms each of which prints a different colored ticket from the others. The various printing devices are duplicate of each other with the exception of their electros, which, of course, are different as they print different values. The printing mechanism for the "six for a quarter" tickets is adapted to issue six tickets upon each complete rotation of the main drive shaft 100 so that the construction of its electro and the gearing for operating the feeding means of this printing device are slightly different from those of the other printing devices and these differences will be pointed out in the following description.

A ticket strip, one for each ticket issuing mechanism, is indicated by the character 431, and referring to Fig. 6 it will be seen that this strip is fed from a ticket roll which is under the machine but not shown in the drawings, upward through a guide 432 between an electro 433 and a platen roll 434 through another guide 435 past the movable severing knife 436 and finally through an opening 437 in the top of the cabinet of the machine. The hood 430 (Fig. 6) on the top of the cabinet and inclined over the opening 437 causes the tickets to pass out through an opening in the glass of the ticket office if the machine is used so that only the purchaser can remove the tickets. Each electro 433 may have any suitable design for printing a design or other matter together with the value of the ticket, the wavy lines shown on the electros in Fig. 9 being used to indicate that the electros have some such design and printed value engraved thereon. An inking roll 438, one for each electro and carried by a rod 439 which rests in the recesses 440 at the upper ends of the arms 441 of a yoke 442 which is mounted on a rod 443, coöperates with the electro to ink the latter. The inking roll is held in engagement with the electro by means of springs 444 (Figs. 6 and 9) coiled about the rod 443 which is supported by plates 445 projecting from the guide 432 for the ticket strips. The eccentrics 446 carried by a shaft 447, which is supported by the plates 445, is employed to control the degree of contact between the electros and the inking rollers.

The electros 433 for the 5¢, 10¢, 20¢ and 25¢ ticket strips are rotated through gears 448 fast thereon and these gears mesh with gears 449 of the same size and fast to the platen rolls 434 (Fig. 6) loose on a rod 450. These platen rolls 434 and electros 433 also serve as the feeding means for the ticket strip as is also usual in the art. The gear wheels 449 (Figs. 1 and 6) in turn mesh with gear wheels 451 which are of the same size as the gear wheels 449 and fast to the shaft 452 and sleeves 453. The shaft 452 is supported at its ends by a frame 389 and the left hand end frame of the machine. A gear wheel 454, rigid with the platen roll 449 for the "six for a quarter" ticket printing device meshes with a gear wheel 455. The gear wheel 454 as shown in Fig. 1 is on the opposite side of the platen from the gear wheel 448 meshing with the gear wheel 449, and the gear wheel 455 has twice as many teeth as the gear wheel 454. The gear wheel 455 is fast to the outermost sleeve 453 and as this sleeve is also given one complete rotation upon each rotation of the main drive shaft 100 when six tickets for a quarter are to be issued, it is clear that the platen 434 and electro 433 for the "six for a quarter" ticket printing device will be given two complete rotations upon each complete rotation of the main drive shaft. Three "six for a quarter" tickets are issued by the "six for a quarter" issuing device upon each rotation of the electro 433, there being three similarly engraved plates 456 (Fig. 9) on its electro 433. On the electro 433 for the "six for a quarter" printing device are also three longitudinally extending perforating blades 457 (Fig. 9), these being fixed 120° apart about the periphery of the electro and projecting radially outward. As the electro 433 and the platen 434 are turned these perforating blades will perforate the ticket strip between the tickets as they are issued. The electros for the other printing devices have no perforating blades as the tickets are partially severed from one another as they are issued by the severing mechanism, as will be presently described.

Only the ticket issuing device corresponding to the key depressed is operated upon an operation of the machine and the means for selectively coupling the desired ticket issuing device to the main operating mechanism will now be taken up in detail. The shaft 452 and each of the sleeves 453 surrounding the shaft (Figs. 3, 7 and 8) have rigidly mounted thereon gear wheels 459 and these gear wheels are the same size as the gear wheels 451 and the gear wheels 459 are mounted on the right hand ends of the shaft 452 and sleeves 453 and are between the central frame 42 of the machine and the auxiliary frame 389, as best shown in Fig. 8. Loosely mounted on the shaft 452 and sleeves 453 and beside the gears 459 are companion or idle gears 460. These companion gears 460 mesh with corresponding gear wheels 461, having the same number of teeth and all rigidly mounted on a shaft 462 supported in suitable bearings in the central frame 42 and in the auxiliary frame 389. At the right hand end of the shaft 462 and to the right of the auxiliary frame 389 is rigidly mounted a mutilated gear 463 (Figs. 3, 7 and 8), a locking portion 464 of which engages the periphery 465 of a locking portion 466 of another mutilated gear wheel 467 which is rigidly mounted on the drive shaft 100. The mutilated gear 463 is of the same diameter as the gear wheels 461 and is the same except that the mutilated gear has the locking portion 464 displacing about six teeth, and the locking portion of this gear can be best seen in Fig. 7. Upon rotation of the drive shaft 100 in a counter-clockwise direction the periphery of the locking portion 466 of the mutilated gear 467 slides out of contact with the locking portion 464 of the mutilated gear 463 and the teeth on the mutilated gear 467 engage the teeth on the mutilated gear 463. As both of these mutilated gears have the same number of teeth it is evident that upon each complete rotation of the gear 467 the gear 463 will also be given one complete rotation and near the end of such rotation the locking portions 466 and 464 of the gears will again be brought into locking engagement.

To selectively connect one of the gears 459 rigid with the shaft 452 or the sleeves 453 with its companion gear 460, the rearwardly extending arm 404 of the tripronged member 400 (Figs. 7 and 8) carries a coupling pinion 470 which is as wide as the combined width of a pair of gears 459 and 460 so that when a key is operated it will, through the links 385, arms 386, sleeves 390 and cam disks 395, rock its pronged member 400 counter-clockwise, as already described, to lower the coupling pinion 470 carried by the pronged member into mesh with its corresponding pair of gears 459 and 460. The rearwardly and downwardly extending arms 471 of the tripronged members 400 carry pins 472 at their free ends and the pins normally engage between the teeth of the gear wheels 459 fast to the shaft 452 and sleeves 453 to prevent rotation of the sleeves and shaft when the pinions 470 are not in engagement with their respective pair of companion gears 459 and 460. When a pinion, however, is lowered into engagement with its pair of companion gears the pin 472 is carried out of contact with the teeth on the gear 459 to permit rotation of the sleeve 453 or the shaft 452 carrying the gear. When the coupling pinions 470 are in their normal position they engage a rod 470ᵃ extending between the central frame of the machine and the auxiliary frame 389, to properly aline the pinions.

By this construction it can be seen that when an amount key is operated, movement of its cam disk 395 through the link 385, arm 386 and sleeve 390 will lower the corresponding pinion 470 so that an idle gear 460 which is rotated at every operation of the machine may turn its companion pinion 459 and therefore the feeding roll or platen 434 and electro 433 of the ticket issuing device assigned to the key depressed, the gear on the platen being in mesh with the corresponding gear 451 mounted on the sleeve or shaft carrying the gear 459 turned through the coupling pinion 470.

The machine, as before stated, is equipped with severing means constructed partially to sever the tickets from one another when more than one ticket is to be issued at a single operation of the machine and to completely sever the last ticket issued from the ticket roll. The device for controlling the partial severance of the tickets from one another will be described later, but the knives and the means for actuating them when but one ticket is to be issued will be taken up now. As shown in Figs. 1 and 21 there are five movable knife edges 436, for each ticket issuing device, and each of these knives 436 is designed to coöperate with a corresponding stationary knife edge 476. The knife edges for one of the printing mechanisms are also shown in Fig. 19. All of the stationary knife edges 476 are formed in a plate or bar 473 rigidly mounted on the top of a frame 477 Figs. 6 and 19. It can be seen from Figs. 6 and 19 that the guides 435 for the ticket strips pass up between the central vertical opening 481 formed between the two bars 478 of the frame 477 and Fig. 19 further shows these bars in cross section. The stationary knife edges 473 are inclined as shown in Figs. 1 and 19 so as to permit a partial severance between the tickets as will be later described. All of the movable knife edges 436 are carried in a frame consisting of a horizontal bar 484 extending over the stationary knife edges and integral at its ends with arms 485 which are fast to a shaft 486 which is loosely carried at the upper ends of two arms 487 which are rigidly mounted on a shaft 488 (Fig. 6). Loosely mounted on the shaft 488 on the right hand side of the arm 487 rigid with the right hand end of the shaft 488 (Fig. 9) is a bell crank lever 489, the outer end of the upwardly extending arm 490 of which is bifurcated to straddle the end of a shaft 491 carried by the arm 487 intermediate their ends. The other arm 492 of the bell crank lever 489 is pivoted at 493 to a pitman 494. The pitman 494 at its lower end is forked over the drive shaft 100 to permit reciprocation of the pitman. A cam groove 495 designed in the face of the disk 496 fast to the drive shaft 100 receives a roller 497 projecting laterally from the pitman 494. When the drive shaft 100 is turned upon an operation of the machine the pitman 494 is driven upward by the cam groove 495 and through the bell crank lever 489 throws the knife carrying frame rearward and while the knife frame is in this position the movable knives 436, being withdrawn from the opening in the guide 435, the printed ticket is fed between the movable knife edge and the stationary knife edge of its issuing device so that when the pitman 494 is restored to normal position the knife frame will be given a forward movement to sever the ticket fed between the knives.

The arms 485 of the knife carrying frames are equipped with rollers 498 (Figs. 1, 6 and 21) which work against the under surfaces of plates 500 fastened by screws 501 (Fig. 1) to the top of the central frame 42 and to the left hand side frame of the machine. These rollers 498 and plates 500 are provided to guide the knife supporting bar 484 in its transverse movements and prevent the movable knife edges from being raised. Each movable knife is fastened to the horizontal bar 484 of the knife carrying frame by two pins 503 which loosely pass through holes in the bar 484. Plungers 504 which are seated in the thick portion of the bar 484 and provided with compression springs, are adjustable and merely rest on top of the movable knife edges to adjust the degree of pressure between the movable knife edges and the stationary knife edges.

As shown in Fig. 9, the shaft 491 connecting the two arms 487 of the movable knife carrying frame is provided at its left hand end with a knurled knob or button 508 and a spring 509 is coiled about the shaft between a collar 510 fast on the shaft and the left hand side arm 487. When a fresh or new ticket roll is being attached to the machine it is desirous to cut off the inserted end of the ticket roll as the edge is usually ragged, and to accomplish this the operator need only grasp the knob 508 and pull the shaft 491 to the left against the action of the spring 509. This carries the right hand end of the shaft 491 out of engagement with the bifurcated end of the arm 490 of the bell crank lever 489. The knife frame can then be manually swung with the shaft 488 without affecting the bell crank lever 489 and after the end of the ticket roll has been pushed up between the knife edges the operator restores the knife frame to normal position to sever the ragged end of the ticket roll and then releases his hold on the button or knob 508 to permit the spring 509 to restore the end of the shaft 491 into normal engagement with the bifurcated end of the arm 490 of the bell crank lever 489. To prevent the knife frame from being drawn backward too far an upwardly spring pressed plunger 512 projects upwardly from the middle of the rear bar 478 of the stationary knife carrying frame in which the plunger is mounted and hence is adapted to limit the extent of backward movement of the knife frame because the upper end of the plunger is in the path of movement of the horizontal bar 484 of the movable knife carrying frame. A plunger rather than a stationary stud is provided for assembling purposes only, as the plunger can be drawn downward to permit the assembling of the knife frame into place.

*Ticket keys.*

The ticket keys 2, as above stated, are mounted in the frame 4 similar to the amount key bank frame 3 and the ticket keys are constructed similarly to the amount keys. The first key 515 in the ticket bank is a release key for permitting the restoration of an operated ticket key to its initial outer position before an amount key is operated. As the amount keys serve to move the motor locking arm 97 (Fig. 10) out of engagement with the clutch connections for the motor to permit the motor to operate the machine, it is desirable to provide a temporary locking detent for temporarily retaining an operated ticket key in depressed position until the release key or an amount key is operated and also to provide another detent which is actuated by the amount keys to retain the operated ticket key in depressed position until near the end of the operation of the machine. The temporary locking detent 516 is shown in Fig. 16 in detail and this detent as well as the permanent locking detent 518 are shown assembled on the key frame 4 in Fig. 4. The temporary detent 516 is pivotally mounted on an arm 519 by a pin 520 and the arm at its lower end is pivotally mounted by a pin 521 to the downwardly extending portion 522 of the key frame 4 and the rear end of the detent is connected by a pin 523 to the upper end of a lever 524 pivotally secured to the downwardly extending portion 525 of the key frame 4 by the pin 526. The pins 26 projecting from the left hand side of the shoulders 13 of the ticket keys normally engage the inclined edges 527 of the projections 528 on the upper edge of the temporary detent 516. Depression of a ticket key through this engagement of its pin 26 with the inclined edge 527 causes the detent 516 to move forward about its pivots 521 and 526 until the roller 26 on a depressed key passes out of engagement with the shoulder of its projection 528 on the detent, when a spring 530 connected at one end to a pin 531 projecting from a portion 532 of a lower edge of the detent and at its other end to a pin 533 projecting from the portion 525 of the key frame 4 draws the detent rearward. In this position of the detent the shoulder 529 passes over the pin 26 on a depressed ticket key and holds the key in depressed position. The rearward movement of the temporary detent 516 is limited by the engagement of the vertical face of the shoulder 534 on the lower edge of the detent with a pin 535 on the key frame. If it is desired to again move the detent forward to release the operated ticket key, as, for example, when the wrong ticket key is operated, the release key 515 is operated before an amount key is operated so that the pin 26 on the release key engages the beveled edge 537 on the detent under the pin and moves the detent rearward the same extent that it was carried forward thereby carrying the shoulder 529 of the projection 528 away from the pin 26 on the operated ticket key to permit the spring 15 coiled about the shank of the ticket key to restore the latter to normal position. In order to permit the restoration of the operated ticket key near the end of the operation of the machine after the proper number of tickets is issued, it is necessary to move the temporary locking detent 516 forward, and this is done in the following described manner as each ticket is issued so that after the variable number of tickets has been issued the operated ticket key can be restored to undepressed position, the permanent locking detent 518 being employed to retain the operated ticket key in depressed position until after all of the tickets have been issued. The lower end of the lever 524 which supports the rear end of the temporary detent 516 is in the path of movement of a roller 517 (Fig. 4) projecting laterally from the free end of the upwardly extending arm 135 of the lever 133. As the anti-friction roller 136 on the arm 135 passes upon every rotation of the shaft 100 from the portion 148 of its cam groove 137 to the portion 151 the arm 135 is drawn rearwardly far enough to effect, through the engagement of the roller 517 with the lever 524, forward movement of the temporary detent 516 so that the shoulder 529 is carried away from the pin on the key, in order to permit restoration of the operated key if the permanent detent 518 is moved out of locking position at the same time.

The detent 518 for retaining the operated keys in their depressed positions until near the end of the operation of the machine is slidably mounted on the right hand side of the portions 522 and 525 of the key frame 4, as a pin 539 projecting from the frame passes through a slot 540 in the rear end of the detent and a pin 541 projecting from the portion 522 of the key frame passes into a notch 542 at the forward end of the detent. This detent 518 is similar to the locking detent 68 for the amount bank in that the projections 94 upon the detent 518 are constructed similarly to those on the detent 68. When a ticket key is depressed and the detent 518 is moved rearwardly upon the operation of an amount key the lower edge of the horizontal portion of the projection 94 passes over the pin 25 projecting from the right hand side of the shoulder 13 of the ticket key and locks the keys in depressed position. Movement of this detent 518 is effected by the amount keys as the lever 20 supporting the plate 17 which is moved rearward by the engagement of the pins 26 on the operated amount keys with the notches 29 in the plate carries a pin 544 which passes into a notch 545 in the rear end of the detent 518. From this description it can be seen that the plate 17 and the key detent 518 are moved as a unit and therefore as the plate 17 is not restored to normal position until near the end of the operation of the machine the depressed ticket key will not be released until the same time.

*Mechanism controlling the variable operation of the machine.*

For the purpose of determining the number of tickets to be issued at a single operation of the main operating mechanism, the ticket bank of keys is provided with a movable plate 550 pivotally carried at its forward and rear ends respectively by the upwardly extending arms 553 and 554 of the levers 553 and 554 (Figs. 4 and 15). The levers 553 and 554 are mounted on the pins 521 and 526 to the right of the temporary locking detent 516. The pins 26 projecting from the left side of the shoulders 13 of the ticket keys coöperate with the inclined edges 555 of the notches 556 in the plate 550. These notches are inclined downwardly and forwardly with differential inclinations, however, and the lower ends of the notches are vertical. The downwardly extending arm 549 of the lever 553 as shown in Fig. 4 is normally raised out of the path of movement of the projection 548 of the pivoted yoke 296 which is rocked forward by the amount keys through the lever 22 and plate 17. After an amount key is depressed a ticket key cannot be operated as the top of the projection 548 is then under the arm 549 and since movement of the arm 549 is blocked the ticket keys can not be operated. The projection 548 is recessed at its forward edge to prevent engagement of the projection with the arm 549 after a ticket key is operated. The pin 26 on the release key 515 in the ticket bank is adapted to engage the forwardly and downwardly inclined edge of a projection 559 (Fig. 15) under the key and on the plate 550 to move the plate 550 rearward slightly so that the engagement of the rear side of the slot 556 with the pin 26 on the depressed key will not frictionally retain the latter key in depressed position. A spring 560 connecting the movable plate 550 at 561 and the key frame at 562 tends to retain the detent in normal position, and the shoulder 564 projecting from the lower edge of the plate 550 with the stud 535 on the key frame prevents movement of the plate past normal position. The rearwardly extending arm 565 is connected by a pin 566 to a link 567 which, at its lower end, is pivotally secured by a pin 568 to an arm 569 of the bell crank lever 64, which, as already stated, is loosely mounted on a shaft 40.

When a ticket key is operated it differentially moved the plate 550 rearwardly by the coöperation of the pin 26 on the key with the inclined edge 555 of the notch 556 under the pin and through the bell crank lever 554 and link 567 the bell crank lever 65 is moved differentially about its pivotal center 40. The number of steps of movement of the bell crank lever 65 is always one step less than the number of tickets to be issued as the bell crank lever 65 is not moved from normal position when but one ticket is to be issued and in this position on the bell crank the first stop 62 on the stepped member 61 is one step of movement of the member 61 from the plate 63 carried by the arm 64 of the lever 65. For example, when the two ticket key is depressed the bell crank lever 64 will be given but one step of movement and when the five ticket key is depressed it will receive four steps of movement.

After the proper ticket key is depressed an amount key is depressed, and as already described, the depression of an amount key through the movable plate 17, bell crank lever 20 supporting the plate, the link 31 and arm 48 rocks the member 38 about its pivot 40 to carry the lug 43 on the arm 44 of the member 38 out of engagement with the upper edge of the uppermost projection 45 on the rear end of the lever 46. If no ticket key is depressed the shaft 47 to which the lever 46 and locking arm 59 and stepped plate 61 are rigidly mounted will be given but one step of movement by the coiled spring 55 as the first stop 62 on the stepped member 61 as already described engages the plate 63 on the bell crank lever 65 which has not been moved from normal position. With the bell crank lever 65 moved differentially out of normal position, however, by a ticket key the shaft 47 and the above mentioned members fast thereto will be given a number of steps of movement depending upon the extent of movement of the bell crank lever 65. Arcs swept from the points of the steps 62 with the shaft 47 as a center are distant from one another an extent equal to one step of movement of the plate 63 on the bell crank lever. If the bell crank lever 65 has been given one extent of movement by the two ticket key the shaft and the above mentioned members rigid thereon will be rocked by the spring 55 until the second step 62$^a$ engages the differentially positioned plate 63 and if the bell crank lever 65 has been given four steps of movement by the five key the shaft and the above mentioned members will be given five extents of movement from normal position, the extent of movement in this case being limited by the engagement of the last stop 62$^c$ on the stepped member 61 with the plate 63. When the shaft 47 and arm 110 (Fig. 10) are rocked one, two or three steps, the roller 109 remains in engagement with the notch 108 in the link 105 and the locking arm 97 will be rocked a corresponding distance. When the shaft 47 and arm 110 are rocked either four or five steps the roller 109 is carried out of engagement with the notch 108 at the beginning of the fourth step of movement, but the roller engages the forward edge of the link 105 to retain the locking arm 97 out of locking position.

As the lever 46 is rocked differentially with the shaft 47 the link 69 pivoted to the forward end of the lever will be lowered a like extent, the notch 71 in the upward end of the link 69 being sufficiently long to permit the link to move five steps without becoming disengaged from the stud 72 on the bell crank lever 74 supporting the rear end of the locking detent 68 for the amount keys, and the locking detents 68 and 518 for the amount and ticket banks of keys are moved forward. On each rotation of the main drive shaft 100 the shaft 47, lever 46, and locking arm 59 are returned one step toward normal position in a manner to be presently described, by the mechanism described above and shown in Figs. 2 and 5. If the shaft 47 and arm 110 are rocked four or five steps the link 105 and arm 97 are not moved during the first or second return steps of movement of the arm 110. During the last three steps of return movement of the arm 110, however, the roller 109 engages the notch 108 and the link 105 and arm 97 are moved step by step during the last three cycles of operation. The separate ticket issuing devices have been described as being adapted to issue one ticket at each rotation of the main drive shaft when the desired ticket issuing device is coupled to the operating mechanism so that the number of tickets issued at any operation of the machine will be the same as the number of rotations of the main drive shaft, the operated amount key being retained in the depressed positions described until the end of the operation of the machine so that the cam disk 395 which is operated by the depressed amount key retains the coupling bar 367 in engagement with the tie bar 375 which is operated by the main operating mechanism to actuate the individual ticket counter and also to retain the broad pinion 470 in mesh with the corresponding pair of companion gears 459 and 460 for driving the feeding mechanism of the ticket issuing device assigned to the key operated.

The operation of the mechanism for restoring the lever 46, motor locking arm 97 and the locking arm 59 step by step to normal position will be readily understood as the lever 46 and therefore these locking arms are moved one step back toward normal position in about the same manner that they are moved their one step to normal position when no ticket key is operated, this latter operation having been already described. To render the operation of this restoring mechanism more readily understood when more than one ticket is to be issued, it will be assumed that the three ticket key has been operated and that subsequently the motor is permitted to operate upon depression of an amount key. The locking arm 97 for the motor and the locking arm 59 upon depression of the amount key are moved three steps from normal position with the lever 46 (Figs. 2 and 5) so that the fourth projection from the bottom on the front end of the lever 46 and indicated by the character "1274" will be almost in the same plane as the plane surface of the stud 125 on the upper end of the lever 124. During the first rotation of the main drive shaft 100 the bell crank lever 118 carrying the lever 124 and the lever 133 having the eccentric slot 130 engaged by the stud 129 on the lower end of the lever 124 are moved as a unit by their respective cam grooves 121 and 137 as explained above so that the plane surface of the stud 125 is nearly in the same plane as the lower face of the third projection 127³ from the bottom. The lever 133 is now given a movement by its cam 137 relative to the lever 118 so that the stud 125 on the lever 124 is carried under the third projection 127³ and subsequently the levers 118 and 133 are moved nearly as a unit to move the lever 46 and therefore the locking arm 59 and the motor locking arms 97 one step in a clockwise direction toward normal locking position. As the end of the first step of movement of the lever 46 is reached the stud 43 on the downwardly extending arm 44 of the multipronged member 38 is moved into engagement with the upper face of the third projection 45ᶜ from the top on the rear end of the lever 46 by the spring 51 and the engagement of the stud 154 (Fig. 2) with the inclined face 159 of the arm 157 forming one arm of the member 38, the upper end of the arm 48 having been cammed out of engagement with the stud 50 on the link 31 by the contact of the stud 154 with the face 155 of the arm 48. The stud 125 on the lever 124 is then carried out of engagement with the projection 127³ and upon the next rotation of the main drive shaft the lever 124 is lowered and moved as before by the lever 133 under the second projection 127² from the bottom. The levers 118 and 133 are then raised as a unit to give the lever 46, locking arm 59 and motor locking arm 97 their second return step of movement. During this movement the member 38 is rocked counter clockwise as viewed in Fig. 2 by the engagement of the lower cam edge of the projection 45ᵇ with the curved surface of the stud 43 on the member and as the stud passed out of engagement with this cam edge, the stud is moved into engagement with the upper face of the projection 45ᵇ in the same manner that the stud was moved into engagement with the upper edge of the third projection 45ᶜ. Upon the last rotation of the main drive shaft 100 the stud 125 is carried under the last projection 127 on the forward end of the lever 46 as described when but one ticket was issued and upon return movement of the levers 118 and 135 to raise the lever 124 carrying the stud 125 the lever 46 is moved to normal position and the locking arm 59 and the motor locking arm 97 being rigid with the lever lock the machine against further movement until an amount key is depressed at the next operation of the machine. During this last step of movement the lower cam edge of the projection 45 on the rear end of the lever 46 engages the curved surface of the stud 43 and cams the stud 43 outward and as the stud 43 passes the point of the projection it is restored to its normal engagement with the upper edge of the projection 45 by the spring 51 and engagement of the stud 154 with the arm 157 of the member 38.

The last increment of movement of the lever 46 to normal last step of movement of the lever 46 to normal position as when but one ticket is issued causes the lower end of the notch 71 in the link 69 to engage the pin 72 which is upon the bell crank lever 74 supporting the rear end of the amount key locking detent 68 and rocks the bell crank lever 74 counter clockwise, so that the detent 68 for the amount keys and the detent 518 for the ticket bank of keys and connected to the plate 17 are moved rearwardly to normal position to permit restoration of the depressed keys by their respective springs 15, the temporary detent 516 for the ticket keys being moved out of locking position at the same time by the engagement of the roller 517 on the lever 133 with the lever 524 supporting one end of the detent. The spring 560 upon restoration of the depressed keys to normal undepressed position restores the differentially movable plate 550 and the bell crank lever 65 connected thereto through the lever 554 and link 567 to normal position, in which position the plate 63 on the bell crank lever 65 is normally one step of movement from the first step 62 on the stepped member 61.

*Mechanism controlling the partial and complete severance of the tickets.*

As stated before, the severing mechanism for severing the tickets from the ticket rolls is adapted to partially sever the tickets from one another when more than one ticket is issued at a single operation of the machine and to wholly sever the last ticket fed through the opening 437 in the cabinet from the ticket roll. To this end the link 105 connecting the motor locking arm 97 and the arm 110 fast to the shaft 47 is provided with a slot 575 (Fig. 10) and the upper end 576 of the slot is inclined to the lower portion 577 of the slot. An arm 573 just within the right hand side frame of the machine and fast to a shaft 579 which is supported at its ends by the right hand side frame and the central frame 42 of the machine, carries a stud 580 at its upper end and the stud passes into the slot 575 and is normally in the upper portion of the latter. The stud 580 also passes through a slot 563 in the side frame 41 and the slot is concentric with the shaft 579 to permit oscillation of the arm 573. When but one ticket is issued the link 105 is raised one step as before described, and this one step of movement of the link is sufficient to rock the arm 573 clockwise as viewed in Fig. 10 so that the stud 580 is positioned at the angle between the upper portion 576 and the lower portion 577 of the slot 575. Further upward movement of the link 105 when more than one ticket is to be issued does not cause further movement of the arm 573, the lower portion 577 of the slot being constructed to have no effect on the arm. Fast to the other end of the shaft 579 and to the right of the central frame 42 is an arm 581 (Figs. 3, 6 and 9) which is bifurcated at its upper end and straddles a pin 582 projecting laterally from the member 583 which surrounds the right hand end of the sleeve 584 which is shown in dotted lines in Fig. 9, and surrounds the shaft 488. The screw 586 connecting the radially projecting flanges 587 of the member 583 may be properly adjusted so that the member 583 is made rigid with the sleeve through frictional forces. The sleeve at its right hand end has an eccentric 588 upon which is loosely mounted the bell crank lever 489 which as heretofore described is actuated by the cam 495 (Fig. 6) through the medium of the pitman 494, to rock the knife carrying frame with the shaft 488. By turning the shaft 579 as the stud 580 (Fig. 10) passes from the upper end of the slot 575 to the angle between the lower and upper portions of the slot when but one ticket is to be issued the member 583, sleeve 584 and the eccentric 588 on the sleeve are turned in a clockwise direction as viewed in Figs. 3 and 6. In this manner the pivotal center of the bell crank lever 489 is so changed that the upper end of its arm 490 is not given its full extent of movement so that the movable knife carrying frame is first moved only far enough forward near the end of the rotation of the main drive shaft to permit the movable knife of the selected ticket issuing device to co-act with but part of the corresponding stationary knife to partially sever the issued ticket from the ticket strip, the cutting edges 482 of the stationary knives 473 being inclined for this purpose. As the stud 580 is in the lower portion 577 of the slot 575 when more than one ticket is to be issued the movable knives 436 will move as just described and the tickets are only partially severed from one another. When only one ticket is to be issued or the last ticket of a plurality of tickets is issued the knife frame is moved as before and only partially severs this ticket from the ticket roll, but when the link 105 is restored to normal position near the very end of the operation of the machine the knife frame is given an extra step of movement not by the cam 495 but through the turning of the eccentric 588 of the sleeve 584 to its normal position, so that the knives will co-act throughout their entire length and continue the severance of the last ticket or a single ticket from the ticket roll.

To prevent overthrow of the movable knife carrying frame due to any play between the parts just described the shaft 579 has fast thereto a nearly semi-circular member 590 the member being fast to the shaft so that the circular edge of the member is eccentric with the shaft. An arm 591 fast to the end of the shaft 488 to which the knife frame carrying arms 487 are fast normally engages the circular edge of the semi-circular member 590. When the knife frame is moved rearward and then moved forward by the cam 495 the arm 591 contacts with the periphery of the member 490 and prevents excess movement of the movable knife frame. The semi-circular member 590 is fast to the shaft 579 so that it will turn with the shaft when the latter is moved by the link 105, so that the member will be engaged by the arm 591 when the knife frame is not given its full extent of forward movement to partially sever the tickets as well as when the knife frame is given its full extent of movement to completely sever a ticket from the ticket strip. The motor does not of itself quite bring the operating parts back to home position and a well known device is provided to accomplish this end. A lever 593 (Fig. 2) is pivoted on a rod 594 and at its upper end carries an antifriction roller 595. A highly tensioned spring 596 connected at one end to the lower end of the lever 593 and at the opposite end to a stud 597 extending from the central frame 42 keeps the roller 595 in engagement with the periphery of an open cam 598 fast to the shaft 381. The cam 598 is so constructed as to gradually extend the spring 596 until near the end of the rotation of the shaft 381 when the roller will engage the nearly radial edge 600 of the cam periphery and thereby permit the spring through the lever 593 to bring the operating parts completely home.

Operation.

The operation of the various mechanisms of the machine has been described in connection with the detailed description of the mechanisms and a brief description of the general operation of the machine is thought to be desirable and will now be given.

The operation of the machine will be described when it is operated to issue three 5¢ tickets. The operator first presses the "3" ticket key and as the pin 26 on the shoulder 13 of the key passes out of engagement with the shoulder 527 (Figs. 4 and 16) of the projection 528 on the temporary locking detent 516 the spring 530 draws the detent forward about its pivots to lock the key in operated position. The depression of this key, through the engagement of the pin 26 on the key with the notch 556 under the pin and in the plate 550, moves the plate differentially rearward and through the lever 554 and link 567 gives the lever 65 two degrees or steps of rotary movement.

The 5¢ key is then depressed and the plate 17 is moved rearward by the engagement of the pin 26 on this key in the notch 29 in the plate and under the pin. The multi-armed member 38, through the lever 20, link 31 and arm 48, is thereby rocked counter-clockwise (Fig. 2) and the stud 43 is carried out of engagement with the projection 45 on the rear end of the lever 46. The lever 46 and shaft 47 are rocked counter-clockwise three steps by the spring 55 and their excursion of movement is limited by the engagement of the stop 62 on the stepped member 61 (Fig. 4) fast to the shaft 47 with the plate 63 on the differentially positioned lever 65. Such movement of the lever 46 lowers the link 69 (Fig. 5) to withdraw the end of the slot 71 in the upper end of the link away from the pin 72 on the bell crank lever 74 for the purpose of permitting the spring 82 to pull the amount key locking detent 68 forward to lock the operated key in depressed position. As the permanent locking detent 518 for the ticket keys is connected by the pin 544 to the lever 20 which supports one end of the plate 17 moved by the amount keys, this detent 518 moves with the plate 17 to lock the operated ticket key in depressed position until the amount key is released near the end of the operation of the machine. As the locking arm 59 is fast to the shaft 47 and the motor locking arm 97 is connected by the link 105 to the arm 110, which is also fast to the shaft 47, it is clear that these locking arms will be moved differentially with the shaft 47 to carry them out of locking position.

Depression of the 5¢ amount key, through the link 385 (Fig. 7) connected to the key, the arm 393, the arm 386 and the outermost sleeve 390, turns the cam disk 395 fast to the sleeve to carry the cam projection 396 on the disk out of engagement with the stud 399 on the arm 401 of the member 400 and the cam projection 397 engages the stud 403 on the arm 404 on this member and thereby rocks the member downward. The stud 406 on the arm 404 being in engagement with the notch 407 in the coupling bar 367 (Fig. 3) for the 5¢ ticket counter swings the coupling bar downward about its pivot 358 to lower the notch 372 in the forward end of the coupling bar into engagement with the operating tie bar 375 carried by the arms 376. The coupling pinion 470 on the arm 404 at the same time is lowered into mesh with the gear wheel 459 for the 5¢ ticket issuing device and its companion gear 460 to cause the pair of gears to rotate as a unit and thereby actuate the 5¢ ticket issuing device.

When the 5¢ key is depressed, its pin 25 enters the slot 201 in the plate 200 and under the pin but as this slot is not inclined as are the slots under the other amount keys the plate 200, the lever 219 and bar 229 are not moved from normal position.

Upon rotation of the main drive shaft 100 the cam 380 (Fig. 3) on the shaft 100 rocks the arms 376 carrying the operating tie bar 375 forward to rock the block 341 carrying the actuating pawl 346 for the 5¢ ticket counter, through the connected coupling bar 367, plate 357 and link 356 which is connected to the block 341. As each ticket is issued the pawl 346 is actuated as just described to add one on the 5¢ ticket counter.

The mutilated gear 467 (Fig. 7) fast to the drive shaft 100 engages the mutilated gear 463 fast to the shaft 462 and rotates this latter shaft and the gear wheels 461. These gear wheels 461 there being one gear wheel for each ticket issuing device, constantly mesh with corresponding idle gear wheels 460 loose on the shaft 452 and sleeves 453 and so gives the gear wheels 460 one complete rotation on each rotation of the main drive shaft. As the gear wheel 459 for the 5¢ ticket issuing device is coupled to its companion idle gear wheel 460 by the coupling pinion 470 the gears are rotated together and through the intermeshing gear wheels 451, 449 and 448 (Fig. 6) operate the 5¢ ticket issuing device, the platen 434 and the electro 433 respectively being rigid with the gear wheels 449 and 448. After a ticket is fed by the platen 434 and the electro 433, the box cam 496, through the medium of the pitman 494 and the bell crank lever 489, moves the movable knife carrying frame 4 to partially sever the ticket strip between the first and second and the second and third tickets and to wholly sever the third ticket from the strip.

At the beginning of each rotation of the main drive shaft 100 the pitman 243 (Figs. 2 and 17) is given a forward movement by the cam groove 246 thereby giving the lower end of the lever 235, which is pivoted to the pitman, an invariable extent of movement. As the roller 233 on the vertical sliding bar 225 is held in normal position by the 5¢ amount key, the upper end of the lever 235 is given one step of movement, and as this end of the lever is connected by a link 238 to the arm 240 fast to the shaft 191 upon which the actuating segment gears 170 and 1701 for the daily and grand totalizers are rigidly mounted, it is evident that the actuating segment gears 170 and 1701 will also be given one step of movement. After the segment gears have been differentially positioned the totalizer carrying frames 174 and 181 are rocked by their respective cam grooves 198 and 1981 through the pitmen 195 and 1951 to lower the pinions rigid with the totalizer elements of lowest denomination into engagement with the positioned actuating gears. Upon downward movement of the daily totalizer carrying frame 174 the multipronged pawl 185 acts upon the proper registering element to add one on the grand ticket counter. The actuating segment gears 170 and 1701 are then restored to normal position and the totalizer carrying frames subsequently raised to their normal position. As the main drive shaft 100 is rotated three times when three tickets are to be issued, the totalizers are actuated successively three times in the manner just described.

Upon each rotation of the main drive shaft 100 the rock shaft 47 together with the locking arm 59, lever 46 and the stepped plate 61 fast to the shaft and the motor locking arm 97 connected to the shaft 47 by the link 105 and arm 110 are returned one step toward locking position. This operation is fully described above and it is thought unnecessary to repeat the same here. During the last step of movement of the lever 46 to normal position the locking detent 68 for the amount keys is moved rearward through the link 69 and lever 74 to permit restoration of the operated keys to normal position by their springs 15. As the plate 17 is connected to the ticket key detent 518 and moved to normal position by its spring 14 upon restoration of the amount keys, the ticket detent 518 is moved to normal unlocking position at about the same time the amount key detent is moved to normal position. Movement of the depressed amount key to its outer position carries its link 385 (Fig. 7) upward with it and thereby turns the operated cam disk 395 to normal position to raise the coupling bar 357 for the 5¢ ticket counter out of engagement with the operating tie bar 375 and also causes the disengagement of the coupling pinion 470 from the companion gears 459 and 460 of the 5¢ ticket printer.

Finally, upon the amount and ticket keys being restored to undepressed position, the plate 200, bell crank lever 219 and the differentially slidable bar 225 are restored to normal position by the spring 212. The plate 17 is moved to normal position by its spring 14 and the spring 51 restores the upper shoulder 49 on the arm 48 into engagement with the stud 50 on the link 31. The spring 560 restores the plate 550 to its initial position and thereby again brings the plate 63 on the lever 65 into contact with the stepped plate 61 above the first stop 62 on the stepped plate.

While the form of mechanism herein shown and described is admirably adapted to fulfil the objects primarily stated, it is to be understood that it is not intended to confine the invention to the one form of embodiment herein shown as it is susceptible of embodiment in various forms all coming within the scope of the claims which follow.

What is claimed is:—

1. In a machine of the class described, the combination with means for issuing a varying number of tickets from a ticket strip at a single operation of the machine; means for determining the number of tickets to be issued; and a device for partially severing the tickets from one another and wholly severing the last ticket from the ticket strip.

2. In a machine of the class described, the combination with a main operating mechanism having a variable period of operation; of a ticket issuing mechanism for issuing from a ticket strip a varying number of tickets at one operation of the main operating mechanism, the number of tickets issued being dependent upon the duration of operation of the operating mechanism; and a severing device controlled by the operating mechanism for partially severing the ticket strip between the issued tickets and wholly severing the last ticket from the strip.

3. In a machine of the class described, the combination with a main operating mechanism having a variable period of operation; of ticket issuing mechanism for issuing from a ticket strip one or more tickets at an operation of the machine, the number of tickets issued being dependent upon the duration of operation of the operating mechanism; manipulative means controlling the extent of operation of the operating mechanism; and a knife positively moved to different extents by the operating mechanism for partially severing the ticket strips between the issued tickets and wholly severing the last ticket from the strip.

4. In a machine of the class described, the combination with a main operating mechanism; of means for issuing from ticket material a varying number of tickets of one of several denominations at a single operation of the machine, and severing means for partially severing the tickets issued at one operation of the machine from one another and wholly severing the last ticket from the ticket material.

5. In a machine of the class described, the combination with a plurality of ticket rolls; and means for selectively severing from any one of said ticket rolls a varying number of tickets, the severance between the tickets being partial and the severance of the last ticket from the selected ticket roll being complete.

6. In a machine of the class described, the combination with a plurality of ticket rolls; of means for selectively severing therefrom a varying number of tickets at a single operation of the machine; and means for partially severing the ticket roll between the tickets and wholly severing the last ticket from the selected roll.

7. In a machine of the class described, the combination with a plurality of ticket rolls; of means for selectively feeding any one of the ticket rolls variable distances equal to the length of a varying number of tickets; and means for partially severing the roll between the fed tickets and wholly severing the last ticket from the selected roll.

8. In a machine of the class described, the combination with a plurality of ticket rolls; of means for selectively feeding any one of the ticket rolls variable distances equal to the length of a varying number of tickets at a single operation of the machine; and a single means for partially severing the rolls between the fed tickets and wholly severing the last ticket from the roll.

9. In a machine of the class described, the combination with a main operating mechanism; of means for issuing a varying number of tickets from a ticket roll at a single operation of the operating mechanism, and a knife, carried by an arm with an eccentric pivot, the eccentricity of the pivot being adapted to be changed by the operating mechanism so that the knife partially severs the ticket roll between the issued tickets and wholly severs the last ticket from the roll.

10. In a machine of the class described, the combination with means for selectively feeding any one of a plurality of ticket strips variable distances equal to the length of a varying number of tickets at a single operation of the machine; of a single movable knife for partially severing the tickets which have been fed from one another and wholly severing the last ticket from the selected strip; and an auxiliary device for preventing overthrow of said knife at each actuation thereof.

11. In a machine of the class described, the combination with a main operating mechanism; of means for issuing from a ticket strip a varying number of tickets at each operation of the machine; a single knife actuated by the operating mechanism for partially severing the tickets issued at each operation from one another and wholly severing the last ticket from a ticket strip; and an auxiliary device also controlled by the operating mechanism for positively preventing the overthrow of said knife at each actuation thereof.

12. In a machine of the class described, the combination with a main operating mechanism; of means for issuing a varying number of tickets from a ticket roll at a single operation of the operating mechanism; a knife; an arm carrying said knife and having an eccentric pivot, the eccentricity of the pivot being adapted to be changed by the operating mechanism so that the knife partially severs the ticket roll between the issued tickets and wholly severs the last ticket from the roll; and a member moved to different extents by the operating mechanism for preventing overthrow of said knife at each actuation of the latter.

13. In a machine of the class described, the combination with a main operating mechanism; of a knife for severing tickets from a ticket roll; a frame carrying said knife and connected to and positively actuated by said operating mechanism; and manipulative means for disconnecting said carrying frame from said operating mechanism to permit manual actuation of the knife carrying frame independently of the operating mechanism, for the purpose described.

14. In a machine of the class described, the combination with a ticket issuing mechanism adapted to issue one or more tickets at an operation of the machine; of motor driven operating means; a device for predetermining the number of tickets to be issued including a locking arm for the driving motor adapted to be differentially moved from a normal position; a plurality of keys for determining the extent of movement of said locking arm, said operating means being constructed to return the locking arm to normal position and render said locking arm effective when the proper number of tickets has been issued; a detent for said keys; and connections between the detent and said determining device whereby movement of the device from normal position causes the detent to lock the operated keys in operated position and return movement of said device moves the detent out of locking position.

15. In a machine of the class described, the combination with ticket issuing mechanism adapted to issue one or more tickets of one of several denominations at a single operation of the machine; of number determining manipulative means for determining the number of tickets to be issued; value determining manipulative means for determining the value of the tickets to be issued; and detents actuated by the value determining manipulative means for locking both the value and number determining manipulative means in operated position until all the tickets are issued; and operating means for moving the detents out of locking position.

16. In a machine of the class described, the combination with a ticket issuing mechanism adapted to issue one or more tickets of one of several denominations at a single operation of the machine; of number keys for determining the number of tickets to be issued; value keys for determining the denomination of the tickets to be issued; a temporary detent for locking the operated number key in operated position until a value key is operated; and connected detents actuated by the value keys for locking the value and number keys in operated position until the end of the operation of the machine.

17. In a machine of the class described, the combination with a ticket issuing mechanism adapted to issue one or more tickets of one of several denominations at a single operation of the machine; of number keys for determining the number of tickets to be issued; value keys for determining the denomination of the tickets to be issued; a temporary detent for locking the operated number key in operated position until a value key is operated; connected detents actuated by the value keys for locking the value and number keys in operated position until the end of the operation of the machine; operating mechanism for moving the temporary detent to normal position as each ticket is issued and moving the last mentioned detents to normal position as the last ticket is issued.

18. In a machine of the class described, the combination with a ticket issuing mechanism adapted to issue one or more tickets of one of several denominations at a single operation of the machine; of number keys for determining the number of tickets to be issued; value keys for determining the denomination of the tickets to be issued; a temporary detent for locking the operated number key in operated position until a value key is operated; connected detents actuated by the value keys for locking the value and number keys in operated position until the end of the operation of the machine; operating mechanism for moving the temporary detent to normal position as each ticket is issued and moving the last mentioned detents to normal position as the last ticket is issued; and a release key for moving said temporary detent to normal position before an amount key is operated.

19. In a machine of the class described, the combination with a plurality of ticket issuing mechanisms; of an operating mechanism common thereto and constructed to be variably operated for the purpose of causing the ticket issuing mechanism to which it is connected to issue one or more tickets; means for coupling the operating mechanism with any one of the ticket issuing mechanisms, the operating mechanism being constructed to uncouple the operating mechanism and the ticket issuing mechanism when the last ticket is issued; and means for determining the number of tickets to be issued.

20. In a machine of the class described, the combination with a plurality of ticket issuing devices; of operating mechanism common thereto; a corresponding number of coupling devices for coupling the desired ticket issuing device to the operating mechanism; cams one for each coupling device for operating the latter; manipulative means for operating the cams; means for retaining the keys in depressed position during an operation of the machine; and means for returning the keys and the cams to normal position and thereby uncoupling the operated coupling device near the end of the operation of the machine.

21. In a machine of the class described, the combination with a plurality of ticket issuing devices; of operating mechanism common thereto and including gear wheels, one for each ticket issuing device; other gear wheels one for each ticket issuing device and beside the first mentioned gear wheels; coupling pinions for coupling the pairs of gear wheels together; pivoted members carrying said pinions; a plurality of keys one for each ticket issuing device; and cams operated by said keys for rocking said members to couple the selected pair of said gear wheels together with the coupling pinion and thereby have the operating mechanism operate the selected ticket issuing device.

22. In a machine of the class described, the combination with a plurality of ticket issuing devices; of operating mechanism common thereto including gear wheels, one for each ticket issuing device; other gear wheels, beside the first mentioned gear wheels; coupling pinions for coupling the pairs of gear wheels together; pivoted members carrying said pinions; a plurality of keys one for each ticket issuing device; and cams operated by said keys for rocking said members to couple the selected pair of said gear wheels together and thereby have the operating mechanism operate the selected ticket issuing device; and means on said members for normally engaging the first mentioned gears to lock the ticket issuing devices not selected for operation against movement.

23. In a machine of the class described, the combination with a plurality of ticket issuing devices; of operating mechanism therefore constructed to be variably operated for the purpose of causing the ticket issuing mechanism to which it is connected to issue one or more tickets; a plurality of coupling devices, one for each ticket issuing device for coupling the desired ticket issuing device to the operating mechanism and normally out of coupling position; cams one for each coupling device for operating the latter; keys for operating the cams; means for restoring the keys and cams to normal position; and manipulative means for determining the number of tickets to be issued.

24. In a machine of the class described, the combination with a main operating mechanism; of ticket issuing mechanism adapted to issue a varying number of tickets of any one of several denominations at a single operation of the machine, number manipulative means for causing the ticket issuing mechanism to issue two or more tickets as desired; and amount manipulative means for determining the denomination of the tickets to be issued and also for causing the ticket issuing mechanism to issue but one ticket of the desired denomination when but one ticket is desired.

25. In a machine of the class described, the combination with ticket strip feeding mechanism, of an oscillatory arm and means for oscillating same at each operation of the machine, a ticket strip cutting knife carried by said arm, an adjustable pivot for the arm, manipulative devices, and means controlled by said manipulative devices for adjusting the pivot to cause the knife to partially sever certain tickets and completely sever others from the ticket strip.

26. In a machine of the class described, the combination with a ticket issuing mechanism constructed to issue one or more tickets of different classes at a single operation of the machine, of number keys for determining the number of tickets to be issued, keys for determining the class of tickets to be issued, and a plurality of detents movable in unison for locking the operated number and class determining keys in operated position until the operation of the ticket issuing mechanism is completed.

27. The combination with a plurality of ticket issuing mechanisms, of driving mechanism common thereto, a series of keys, one for each ticket issuing mechanism, and devices whereby any desired ticket issuing mechanism may be operatively connected to the driving mechanism by operating the corresponding key, and means whereby the operated ticket issuing mechanism may receive a variable number of actuations.

28. In a machine of the class described, the combination with a plurality of ticket issuing mechanisms, of a variably operable motor common thereto, a series of keys, one for each ticket issuing mechanism, devices whereby any desired ticket issuing mechanism may be operatively connected to the motor by operating the corresponding key, and manipulative devices for controlling the variable operation of the motor.

29. In a machine of the class described, the combination with a plurality of ticket supply rolls, of mechanism for issuing and severing a variable number of tickets from any desired roll, a series of keys for determining the roll from which the tickets are to be issued and severed, and a second series of keys for determining the number of tickets to be issued and severed.

30. In a machine of the class described, the combination with a plurality of ticket issuing mechanisms each differentially operable to feed one or more tickets as desired, of a variably rotatable shaft, means for variably rotating said shaft, a series of keys and devices controlled thereby for establishing a driving connection between the shaft and any desired ticket issuing mechanism, and means for controlling the variable rotation of the shaft.

31. In a machine of the class described, the combination with a plurality of ticket issuing mechanisms each differentially operable to feed one or more tickets as desired, of a variably rotatable shaft, means for variably rotating said shaft, a series of keys and means controlled thereby for selectively connecting the ticket issuing mechanisms to said shaft whereby to effect differential operation of the selected mechanism, and a series of keys and devices controlled thereby for controlling the variable rotations of said shaft.

32. The combination with a plurality of ticket issuing mechanisms, of driving mechanism common thereto, a series of keys, one for each ticket issuing mechanism, and devices whereby any desired ticket issuing mechanism may be operatively connected to the driving mechanism by operating the corresponding key, and means whereby a variable number of tickets may be issued by the operated ticket issuing mechanism during one operation thereof.

33. The combination with a plurality of ticket issuing mechanisms, of driving mechanism common thereto, a series of keys, one for each ticket issuing mechanism, and devices whereby any desired ticket issuing mechanism may be operatively connected to the driving mechanism by operating the corresponding key, and means whereby only one ticket issuing mechanism may be operatively connected to the driving mechanism during the operation thereof.

34. The combination with a plurality of ticket issuing mechanisms, of driving mechanism common thereto, a series of keys, one for each ticket issuing mechanism, and devices whereby any desired ticket issuing mechanism may be operatively connected to the driving mechanism by operating the corresponding key, and means controlled by the keys whereby only one ticket issuing mechanism may be operatively connected to the driving mechanism during the actuation thereof.

35. The combination with a plurality of ticket issuing mechanisms, of driving mechanism common thereto, a series of keys, one for each ticket issuing mechanism, and devices whereby any desired ticket issuing mechanism may be operatively connected to the driving mechanism by operating the corresponding key, and a locking device controlled by the keys whereby only one ticket issuing mechanism may be operatively connected to the driving mechanism during the actuation thereof.

In testimony whereof I affix my signature in the presence of a witness.

FRANCESCO SKERL.

Witness:
K. SCHLOSS.

Copies of this patent may be obtained for five cents each, by addressing the "Commissioner of Patents, Washington, D. C."